(12) United States Patent
Ferko et al.

(10) Patent No.: US 9,229,689 B2
(45) Date of Patent: Jan. 5, 2016

(54) SYSTEM AND METHOD FOR PROVIDING USER SUPPORT IN DESIGNING GRAPH STRUCTURES

(71) Applicant: Software AG, Darmstadt (DE)

(72) Inventors: Michal Ferko, Kosice (SK); Frank Weyand, Schoeneck (FR)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 14/291,110

(22) Filed: May 30, 2014

(65) Prior Publication Data
US 2015/0347091 A1 Dec. 3, 2015

(51) Int. Cl.
*G06F 9/445* (2006.01)
*G06F 9/44* (2006.01)

(52) U.S. Cl.
CPC ........................................ *G06F 8/20* (2013.01)

(58) Field of Classification Search
None
See application file for complete search history.

(56) References Cited

U.S. PATENT DOCUMENTS

2009/0007056 A1* 1/2009 Prigge et al. .................. 717/104

* cited by examiner

*Primary Examiner* — Chuck Kendall
(74) *Attorney, Agent, or Firm* — Posz Law Group, PLC

(57) ABSTRACT

A computer system for providing user support in editing graph structures includes a memory, a display, and a processor cooperatively operable with the display and the memory. The processor, based on instructions stored in the memory, causes the display to present, on a user interface, a visualization of a graph structure that includes one or more connections and one or more objects. Each of one or more connections represents a connection of two or more objects. In response to an action by user that selects at least one of the one or more connections and one or more objects, the processor causes the display to present, on the user interface, in real time, a support that indicates an allowable modification to the graph structure based on a methodology to which the graph structure is assigned and the selection of the one or more connections and one or more objects.

14 Claims, 52 Drawing Sheets

2a
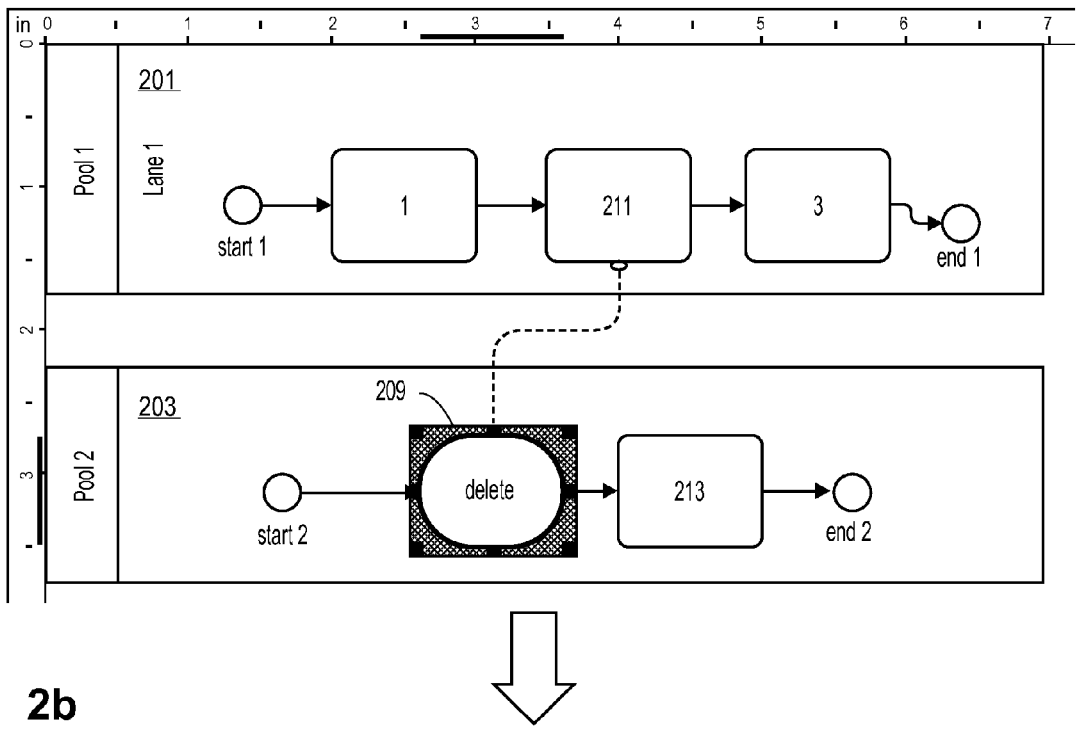
2b
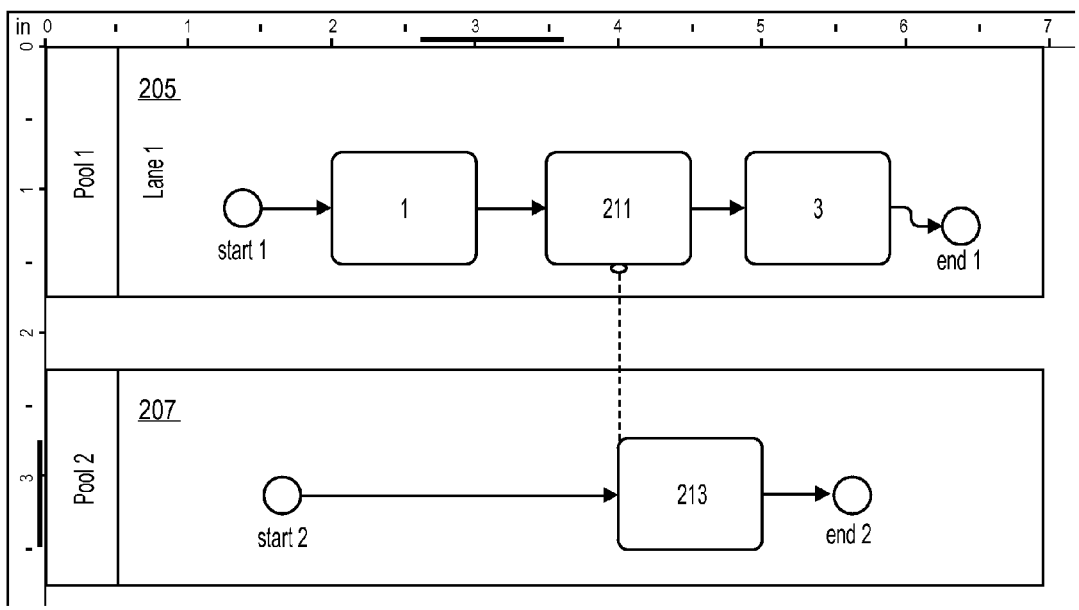
FIG. 2
CONVENTIONAL ART

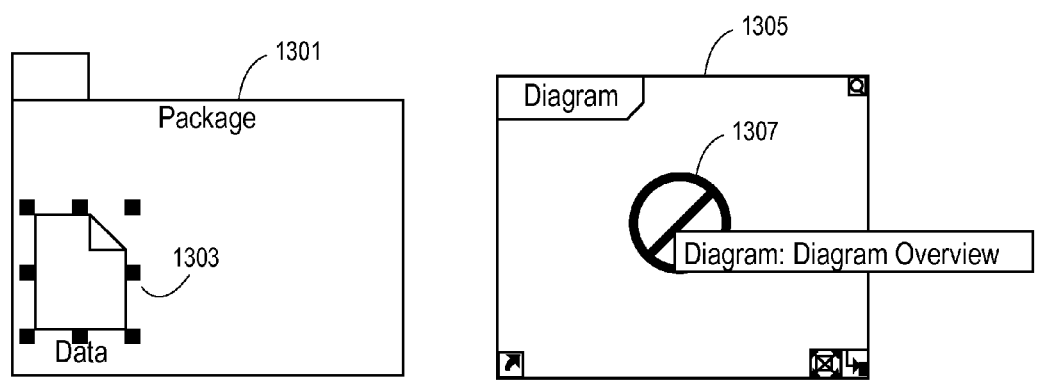
FIG. 13
CONVENTIONAL ART
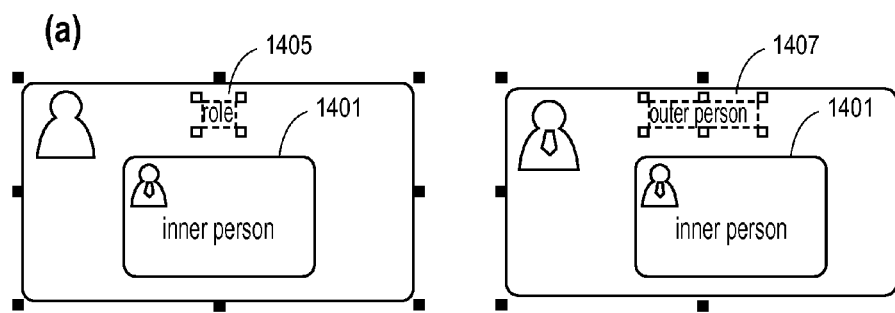
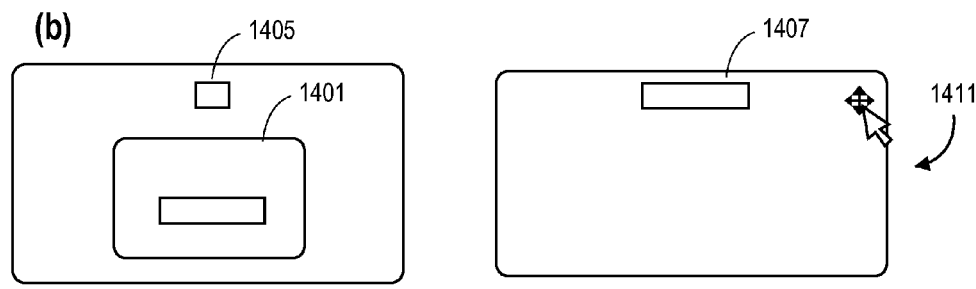
FIG. 14
CONVENTIONAL ART 18a
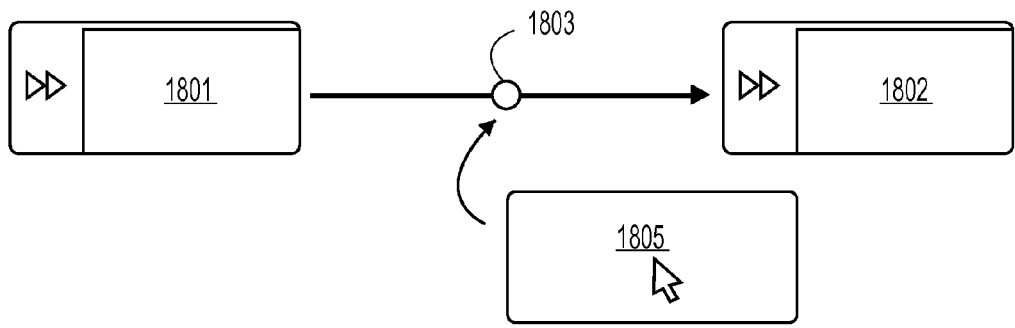
18b
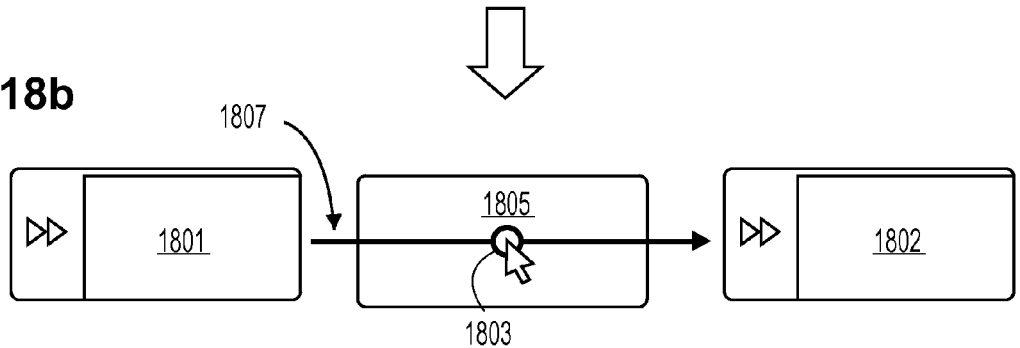
FIG. 18

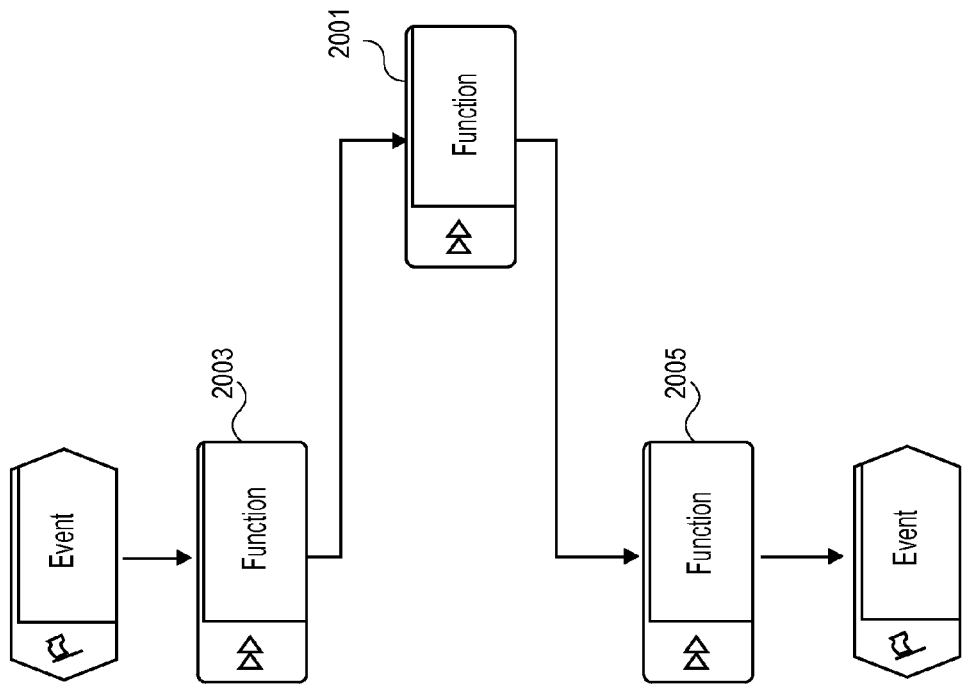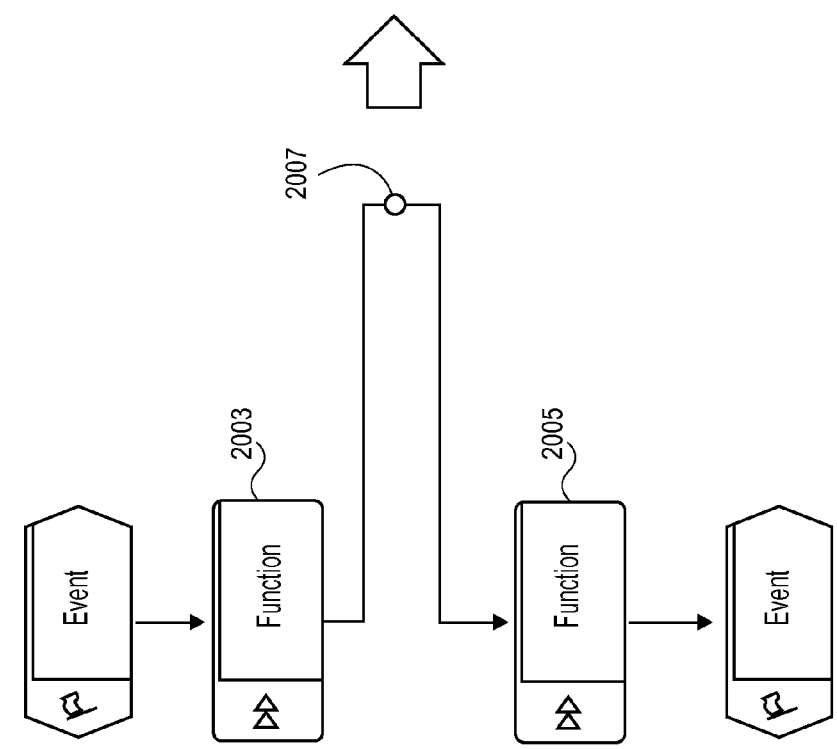
FIG. 20

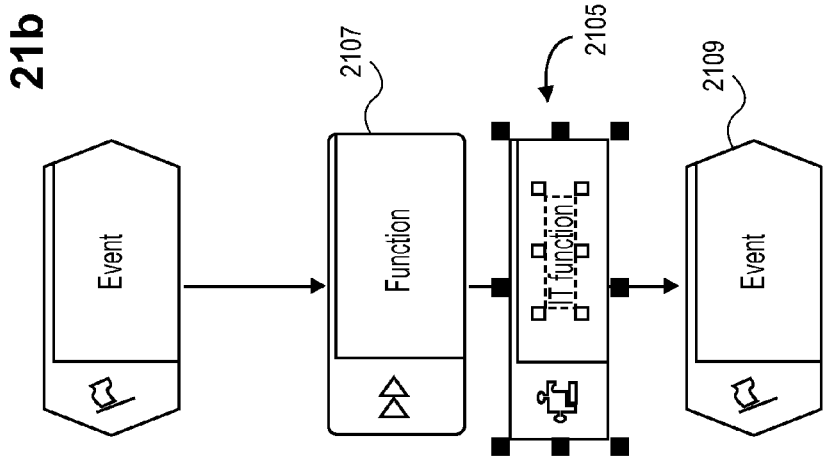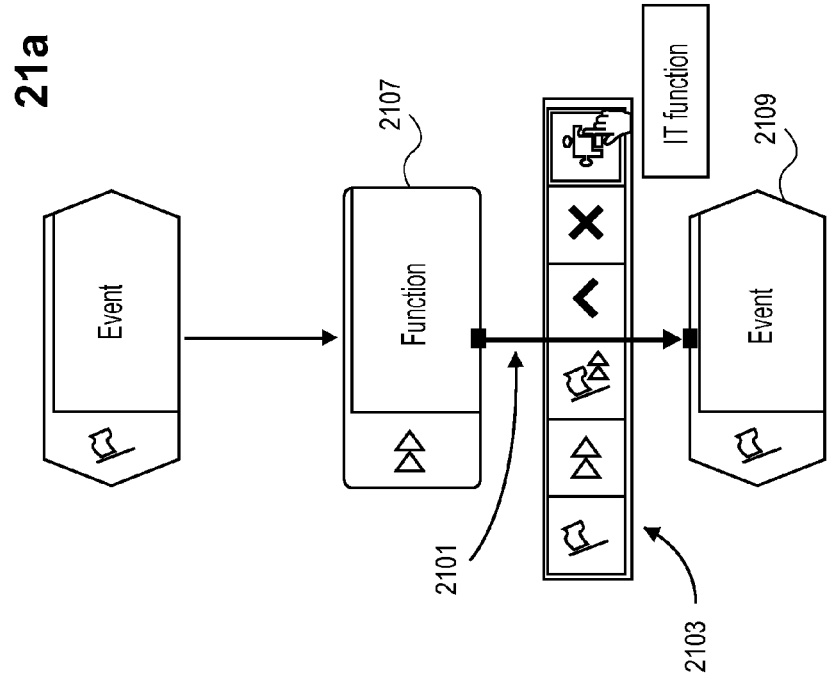
FIG. 21

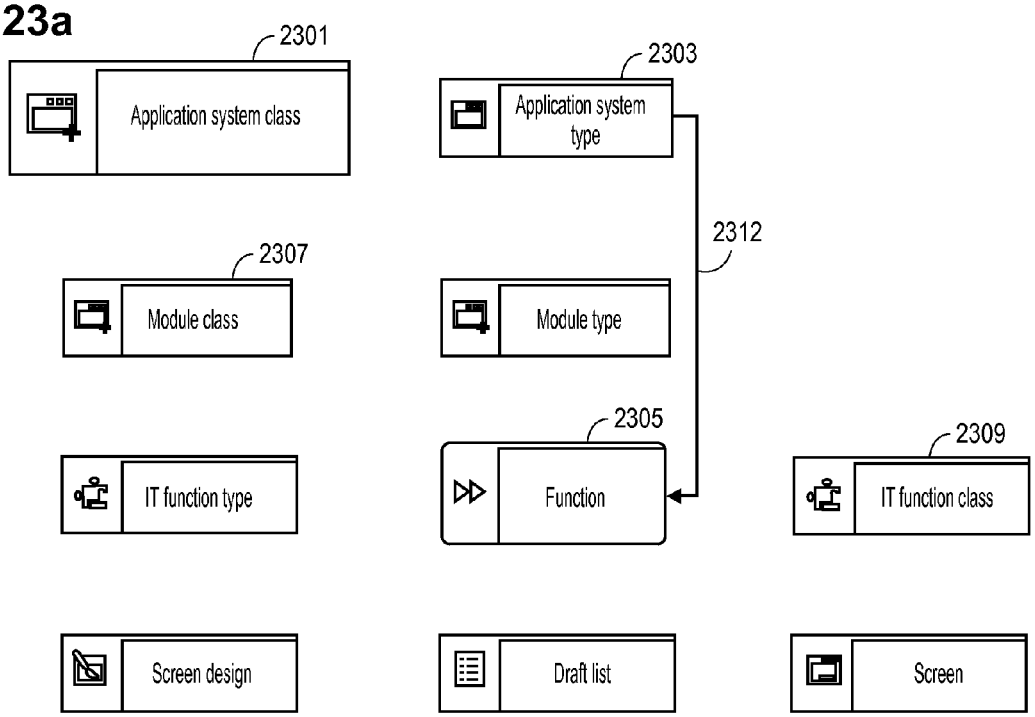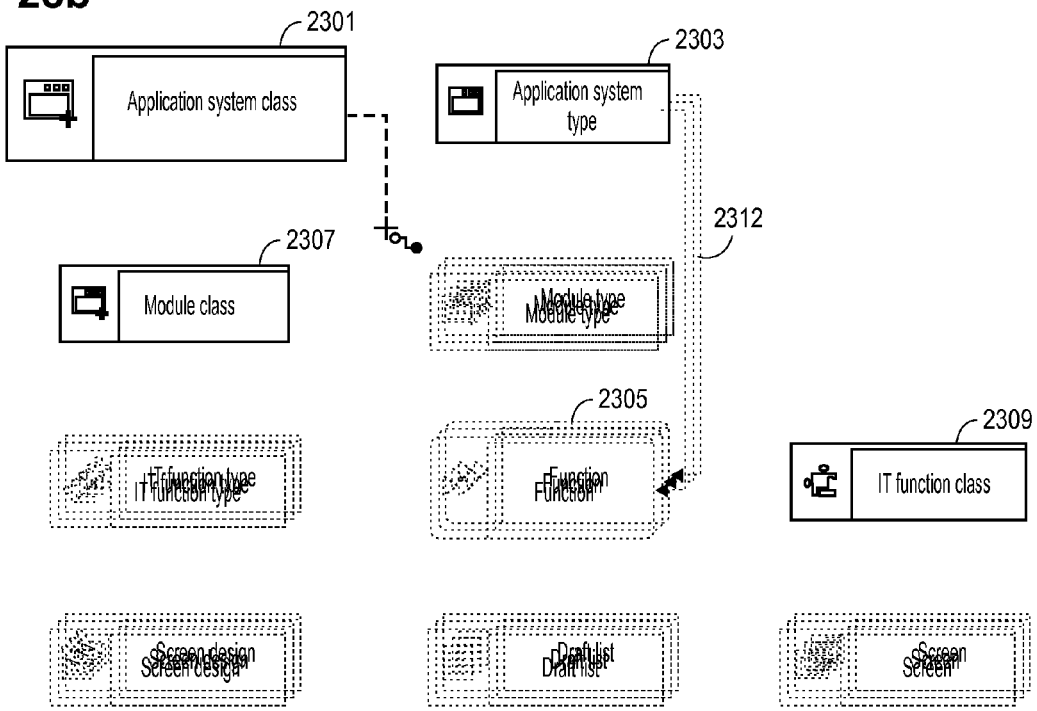
FIG. 23

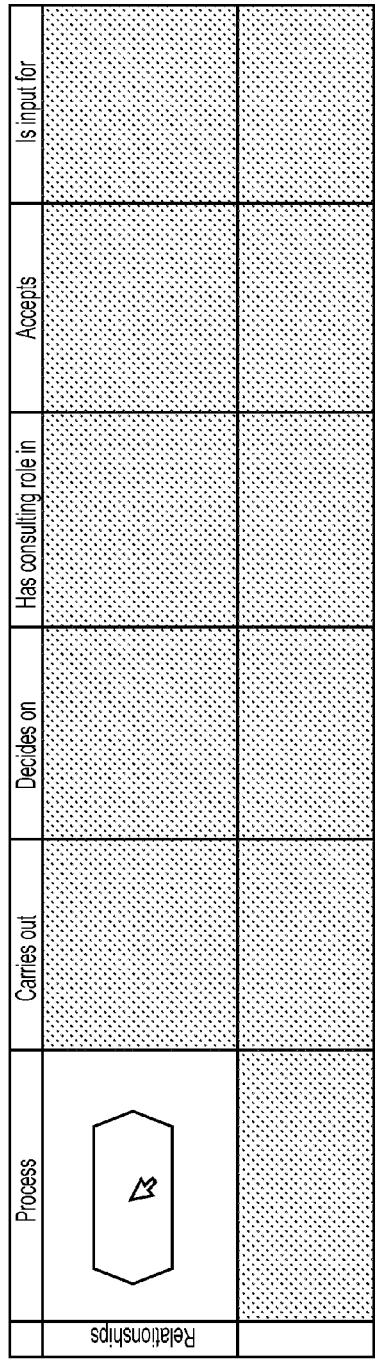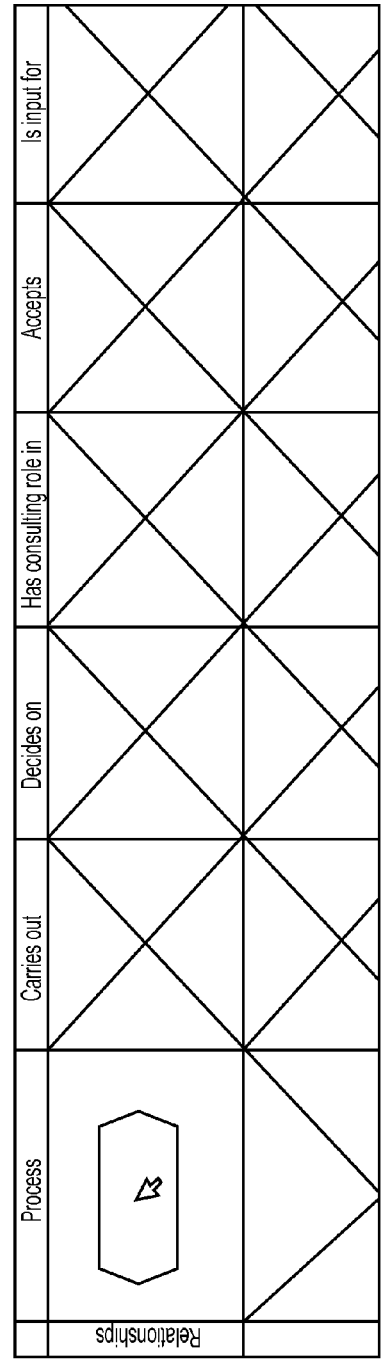
FIG. 25

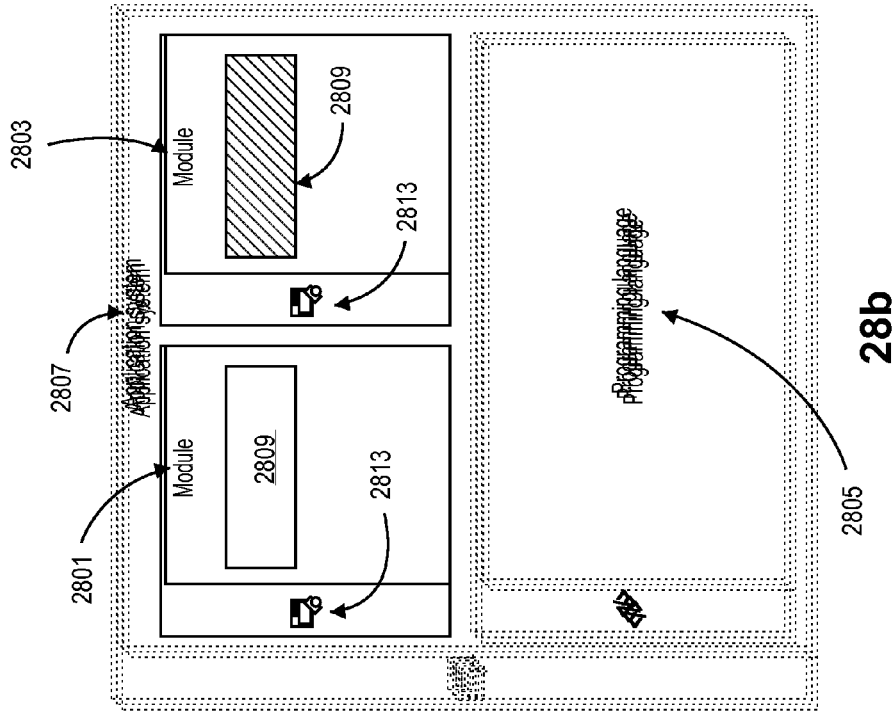
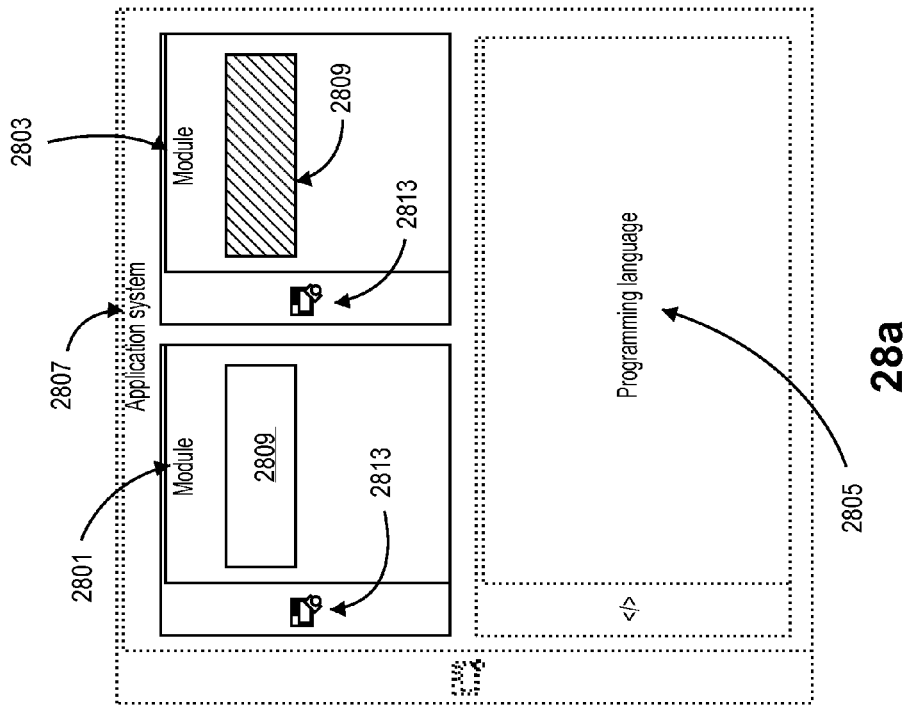
FIG. 28

FIG. 30

```
onObjectIsDeleted (GraphNode start_object) {
  if (OPTIONS.getKeepGraphStructureOption() is not
OPTIONS.NEVER and
      start_object.getIncomingEdges().size() is 1 and
      start_object.getOutgoingEdges().size() is 1) {

// these are the old connections. We need them
later on
    GraphEdge first =
start_object.getIncomingEdges().getFirstElement()
    GraphEdge second =
start_object.getOutgoingEdges().getFirstElement()

if (first.isStructureBuilding() AND
second.isStructureBuilding()) {
      GraphNode predecessor = first.getSource()
      GraphNode successor = second.getTarget()
      Graph graph = start_object.getGraph()
      MetaModel meta_model = graph.getMetaModel()
      GraphEdge new_edge = tryToCreateNewConnection
(predecessor, successor, meta_model)
      if (new_edge is not NOTHING) {
        // the user did not press cancel... the new
connection is created
        // so let us take over the graphical properties
from the old connections.
        handleGraphicProperties(first, second,
new_edge)
      }
    }

```
GraphEdge tryToCreateNewConnection (GraphNode
predecessor, GraphNode successor, MetaModel meta_model)
{
   List<ConnectionType> listTypes =
        meta_model.getConnectionTypesForObjects (
           predecessor.getObjectType(),
           successor.getObjectType(),
STRUCTURE_BUILDING_ONLY )

if (listTypes.isEmpty()) {
     // do nothing, get out of here since no connection
type is possible. Graph will be broken.
     return NOTHING
   } if (listTypes.size() == 1) {
     // just one type possible: create connection, no
need to ask the user
     return createNewConnection(predecessor, successor,
listTypes.getFirstElement() )
   }
   else {
     // multiple connections... check option
     if (OPTIONS.getKeepGraphStructureOption() is
OPTIONS.ALWAYS) {
        ConnectionType typeForConnection =
getConnectionTypeFromUser(listTypes)
        if (typeForConnection is not NOTHING) {
          // user did choose a connection type -> create
the connection
          return createNewConnection(predecessor,
successor, typeForConnection )
        }
     }
   }
   return NOTHING

```
GraphEdge createNewConnection (GraphNode predecessor,
GraphNode successor,ConnectionType typeForConnection) {

Graph graph = predecessor.getGraph()    // every node
has a reference to the graph
  GraphEdge new_edge = graph.createNewEdge(predecessor,
successor, typeForConnection)
  return new_edge

```
ConnectionType getConnectionTypeFromUser
(List<ConnectionType> listTypes) {

DialogForConnectionType dialog = new
DialogForConnectionType(listTypes)
  dialog.show()
  if (dialog.userPressedCancel()) {
    return NOTHING;
  }
  ConnectionType type_selected_by_user =
dialog.getSelectedConnectionType()
  return type_selected_by_user

```
handleGraphicProperties( GraphEdge old_1, GraphEdge
old_2, GraphEdge new_edge) {

List<ConnectionStyle> listStylesOld_1 =
old_1.getGraphicalProperties()
  for_all: styleFromOld_1 from listStylesOld_1 {
    if (old_2.hasStyle(styleFromOld_1)) {
      // this style is the same for old_1 and old_2:
      // so use this style for the new connection as well
      new_edge.setStyle(styleFromOld_1)
    }
  }

```
List<GraphEdge> getEdgesForObjectType( ObjectType
objecttype, Graph graph ) {

List<GraphEdge> listValidConnections = new
List<GraphEdge> ()
  MetaModel meta_model = graph.getMetaModel()

List<GraphEdge> listAllEdges = graph.getAllEdges()
  for_all: edge from listAllEdges {
    GraphNode source = edge.getSource()
    GraphNode target = edge.getTarget()
    if ( objectTypeCanBeUsedToSplit (objecttype,
source, target, meta_model)) {
      listValidConnections.add(edge)
    }
    else {
      // this connection cannot be used to split with
the given object type,
      // so let us mark this connection as not a valid
connection to place an object upon
      edge.setInvalidState()
    }
  }
  return listValidConnections

```
Boolean objectTypeCanBeUsedToSplit
      (ObjectType objecttype, GraphNode source,
GraphNode target, MetaModel meta_model) {

List<ConnectionType> listOutgoingConnections =
meta_model.getPossibleOutgoingConnectionTypes(source.ge
tObjectType())
    List<ConnectionType> listIncomingConnections =
meta_model.getPossibleIncomingConnectionTypes(target.ge
tObjectType())

if
(listOutgoingConnections.containsTargetType(objecttype)
AND
listIncomingConnections.containsSourceType(objecttype)
) {
        return TRUE
    }
    return FALSE
}
```

FIG. 37A

```
List<ObjectType> getObjectTypesForConnection( GraphEdge
edge_for_split) {

List<ObjectType> listValidObjectTypes = new
List<ObjectType> ()

if (OPTIONS.getSplitConnectionOptions() is
OPTIONS.NEVER) {
    // the user set "Never" in the options to split
connections, so do not offer splitting
    return listValidObjectTypes
  }

GraphNode source = edge_for_split.getSource()
  GraphNode target = edge_for_split.getTarget()
  Graph graph = source.getGraph()
  MetaModel meta_model = graph.getMetaModel()

// let us examine all object types available in this
model type
  List<ObjectType> listObjectTypes =
meta_model.getObjectTypesForModel(graph.getModelType())

List<ConnectionType> listOutgoingConnections =
meta_model.getPossibleOutgoingConnectionTypes(source.ge
tObjectType())
  List<ConnectionType> listIncomingConnections =
meta_model.getPossibleIncomingConnectionTypes(target.ge
tObjectType())

for_all: objectType from listObjectTypes) {
    if
(listOutgoingConnections.containsTargetType(objectType)
AND
```

FIG. 37B

```
listIncomingConnections.containsSourceType(objectType)
) {
      listValidObjectTypes.add(objectType)
   }
 } return listValidObjectTypes

```
splitConnection ( GraphEdge edge_for_split, ObjectType
object_type) { if (OPTIONS.getSplitConnectionOptions() is
OPTIONS.NEVER) {
    // the user set "Never" in the options to split
connections, so do not offer splitting
    return
  }

GraphNode source = edge_for_split.getSource()
  GraphNode target = edge_for_split.getTarget()
  Graph graph = source.getGraph()
  MetaModel meta_model = graph.getMetaModel()

List<ConnectionType> listConnectionTypesForSource
       = getConnectionTypes(source.getObjectType(),
object_type, meta_model, graph.getModelType())
  List<ConnectionType> listConnectionTypesForTarget
       = getConnectionTypes(object_type,
target.getObjectType(), meta_model,
graph.getModelType())

if (listConnectionTypesForSource.size() is 1 AND
listConnectionTypesForTarget.size() is 1) {
    createConnectionAndObject(
       object_type, source, target, edge_for_split
       lstConnectionTypesForSource.getFirstElement(),
       lstConnectionTypesForTarget.getFirstElement(),
       graph )
  }
  else {
    // we have more than one incoming and/or outgoing
connection...
    // but we can show the dialog only if the user has
set the right option
    if (OPTIONS.getSplitConnectionOptions() is
OPTIONS.ALWAYS) {
```

FIG. 38B

```
  DialogToSplitConnections dialog =
          new
DialogToSplitConnections(lstConnectionTypesForSource,
lstConnectionTypesForTarget)
      dialog.show()
      if (NOT dialog.userPressedCancel()) {
        createConnectionAndObject(
          object_type , source, target, edge_for_split
          dialog.getFirstConnectionType(),
          dialog.getSecondConnectionType(),
          graph )
        }
      }
    }

```
List<ConnectionType> getConnectionTypes (
        ObjectType object_type_source, ObjectType
object_type_target,
        MetaModel meta_model, ModelType model_type) {

List<ConnectionType> listValidConnectionTypes = new
List<ConnectionType> ()
  List<ConnectionType> listAllConnectionTypes =
meta_model.getAllConnectionTypesForModelType(model_type
);

for_all: connection_type from listAllConnectionTypes)
{
    if (connection_type.getSourceObjectType() IS
object_type_source AND
        connection_type.getTargetObjectType() IS
object_type_target) {
      listValidConnectionTypes.add(connection_type)
    }
  }
  return listValidConnectionTypes
}
```

FIG. 40

```
createConnectionAndObject (ObjectType object_type,
                GraphNode source, GraphNode target,
GraphEdge edge_for_split
                ConnectionType
connection_type_from_source,
                ConnectionType
connection_type_to_target, Graph graph) {

Point positionForObject =
SYSTEM.getClickPositionForNewObject()
  graph.deleteEdge(edge_for_split)
  GraphNode new_node = graph.createNewNode(object_type,
positionForObject)
  GraphEdge edge_1 = graph.createNewEdge(source,
new_node, connection_type_from_source)
  GraphEdge edge_2 = graph.createNewEdge(new_node,
target, connection_type_to_target)

if (OPTIONS.getSplitConnectionOptions () is
OPTIONS.INSERT_SPACE_FOR_NEW_OBJECT) {
    graph.insertSpaceForNewObject(new_node)
  }

```
startCreateConnection (GraphNode start_object) { handleAllInvalidOppositeObjectForMetaModel
(start_object)
  displayRuleCheckResults (start_object)
  start_object.getGraph().redraw()

```
handleAllInvalidOppositeObjectForMetaModel (GraphNode start_object) {

Graph graph = start_object.getGraph()
  List<GraphNode> listOfAllNodes = graph.getAllNodes()
  MetaModel meta_model = graph.getMetaModel()
  for_all: node_of_list from listOfAllNodes {
    if (node_of_list is not start_object) {
      if (NOT(meta_model.canBeConnected(
              node_of_list.getObjectType(),
start_object.getObjectType() )
              OR meta_model.canBeConnected(
start_object.getObjectType(),node_of_list.getObjectType
())){
          node_of_list.setInvalidForConnection(true)
      }
    }
  }
}
```

FIG. 43

```
displayRuleCheckResults (GraphNode start_object) {

Graph graph = start_object.getGraph()
  SemanticCheckEngine semcheck_engine =
graph.getSemCheckEngine()
  List<Rule> listRules = semcheck_engine.getAllRules()
  List<GraphNode> listOfAllNodes = graph.getAllNodes()
  for_all: rule from listRules {
    for_all: node_of_list from listOfAllNodes {
      if (NOT node_of_list.isInvalidForConnection()) {
        SemcheckResult result =
rule.check(start_object, node_of_list)
        if (NOT (result.isOK())) {
          node_of_list.setMarkForSemanticCheck(result)
        }
      }
    }
  }
}
```

FIG. 44

```
placingNewObjectInToDiagram(Diagram diagramWithLanes,
ObjectType objType) {
  List<LaneCell> laneCells =
getLaneCells(diagramWithLanes)
  displayMetaModelFeedback(objType, laneCells)
  displaySemanticCheckHints(objType, laneCells,
diagramWithLanes)
  diagramWithLanes.redraw()
}
```

FIG. 45

```
getLaneCells(Diagram diagramWithLanes) {
  List<LaneCell> laneCells = new List<LaneCell>()
  List<Lane> horizontalLanes =
diagramWithLanes.getHorizontalLanes()
  List<Lane> verticalLanes =
diagramWithLanes.getVerticalLanes()
  if (NOT horizontalLanes.isEmpty()) {
    for_all: hLane from horizontalLanes {
      if (NOT verticalLanes.isEmpty()) {
        for_all: vLane from verticalLanes {
          LaneCell cell = new LaneCell(hLane,vLane)
          laneCells.add(cell)
        }
      } else {
        LaneCell cell = new LaneCell(hLane)
        laneCells.add(cell)
      }
    }
  } else {
    for_all: vLane from verticalLanes {
      LaneCell cell = new LaneCell(vLane)
      laneCells.add(cell)
    }
  }
  return laneCells
}
```

FIG. 46

```
displayMetaModelFeedback(ObjectType objType,
List<LaneCell> laneCells) {
  for_all: cell from laneCells {
    if(cell.isObjectAllowed(objType)) {
      cell.displayPositiveFeedback()
    } else {
      cell.displayNegativeFeedback()
    }
  }
}
```

FIG. 47

```
displaySemanticCheckHints (ObjectType objType,
                          List<LaneCell> laneCells,
                          Diagram diagram) {
  SemanticCheckEngine semCheckEngine =
diagram.getSemCheckEngine()
  List<Rule> listRules = semcheck_engine.getLaneRules()
  for_all: laneRule of listRules {
    for_all: cell from laneCells {
      if (cell.isObjectAllowed(objType)) {
        SemcheckResult result = rule.check(cell,
objType)
        if (result.hintForCellExists()) {
          cell.displayHintsAccordingToResult(result)
        }
      }
    }
  }
}
```

FIG. 48

```
placingNewEmbeddedObjectInToDiagram (Diagram diagram,
ObjectType objType) {
  List<GraphNode> validTargetNodes =
                  displayMetaModelFeedback (objType,
diagram)
  displaySemanticCheckHints(objType, validTargetNodes,
diagram)
  diagram.redraw()
}
```

FIG. 49

```
List<GraphNode> displayMetaModelFeedback
                (ObjectType objType, Diagram diagram) {
  Graph graph = diagram.getGraph()
  List<GraphNode> allowedTargetNodes = new
List<GraphNode>()
  List<GraphNode> stackList = new List<GraphNode>()
  List<GraphNode> topLevelNodes= graph.getNodes()
  stackList.addAll(topLevelNodes)
  while (NOT stackList.isEmpty()) {
    GraphNode node =
stackList.getFirstElementAndRemoveIt()
    if ( node.canContainEmbeddedObject(objType)) {
      node.displayPositiveFeedback()
      allowedTargetNodes.add(node)
    } else {
      node.displayNegativeFeedback()
    }
    List<GraphNode> embeddedNodes =
node.getEmbeddedNodes()
    if ( NOT embeddedNodes.isEmpty()) {
      stackList.addAll(embeddedNodes)
    }
  }
  return allowedTargetNodes
}
```

FIG. 50

```
displaySemanticCheckHints (ObjectType objType,
                          List<GraphNode> validNodes,
Diagram diagram) {
  SemanticCheckEngine semCheckEngine =
diagram.getSemCheckEngine()
  List<Rule> listRules =
semcheck_engine.getEmbeddedNodesRules()
  for_all: rule of listRules {
    for_all: node of validNodes {
      SemcheckResult result = rule.check(node, objType)
      displayHintsAccordingToResult(node,  result)
    }
  }
}
```

SYSTEM AND METHOD FOR PROVIDING USER SUPPORT IN DESIGNING GRAPH STRUCTURES

TECHNICAL FIELD

The technical field relates in general to computer-aided creation of graph structures, and more particularly to the provision of support related to meta model and semantic rules governing the computer-aided creation of the graph structures.

BACKGROUND

Graph structures are widely used in the software industry to describe and support models of various types. When designing a graph structure, it is necessary to keep the graph consistent and to maintain graph integrity. That is to say, changes in the graph structure, whether by deletion or addition, must not result in a break in graph structure flow.

Designing a graph structure is necessarily based on certain methodologies and according to semantic rules.

Unfortunately, current modeling technology provides user interfaces that necessitate trial and error user actions, and consequently can be very cumbersome for the user who must maintain integrity of the graph structure. Current modeling technology does not provide a framework which sufficiently supports a user.

SUMMARY

Accordingly, one embodiment disclosed herein is directed to a computer system comprising a memory, a display, and a processor cooperatively operable with the display and the memory. Based upon instructions stored in the memory, the processor is configured to cause the display to present, on a user interface, a visualization of a graph structure that includes one or more connections and one or more objects. Each of the one or more connections represents a possible or actual connection of two objects. In response to an action by a user that selects at least one of the one or more connections and one or more objects, the processor is further configured to cause the display to present, on the user interface, in real time, a support. The support indicates an allowable modification to the graph structure based on a methodology to which the graph structure is assigned and the selection of the at least one of the one or more connections and one or more objects.

Another embodiment disclosed herein is directed to a non-transitory, computer-readable storage medium. The storage medium has instructions stored thereon. When the instructions are executed by a processor-based computer system that includes a display, a method is performed.

The method includes presenting a graph structure in the display that may include one or more connections and one or more objects. Each of the one or more connections represents a possible or actual connection of two objects. The method further includes, based on an indicated action by a user, presenting in the display in real time a support. The support indicates an allowable modification to the graph structure.

According to another embodiment, the action by the user is deletion of an existing object that is connected between a first object and a second object, and the support is a dialog box that shows, as the allowable modification, one or more connections that can connect the first and second objects depending on the nature of the relationship of the first and second object to each other according to the methodology of the graph structure.

According to still another embodiment, the action by the user is a selection of a new or existing object for placement onto an existing connection that connects a first object and a second object, and the support is a catchpoint that indicates, as the allowable modification, that the existing connection is available for placement of the new or existing object according to the methodology of the graph structure.

According to a further embodiment, the action by the user is a selection of a new or existing object for placement onto an existing connection that connects a first object and a second object, and the support is a dialog box that shows, as the allowable modification, possible connection types between the first object and the new or existing object and possible connection types between the new or existing object and the second object according to the methodology of the graph structure.

According to still a further embodiment, the action by the user is a selection of an existing connection that connects a first object and a second object, and the support is a displayed list that shows, as the allowable modification, those objects that can be placed onto the existing connection so as to split the existing connection, in consideration of the first object the second object according to the methodology of the graph structure.

In still another embodiment, the action by the user is creating a connection, as a created connection, that is extended from a placed object, and the support is a filtering out of an existing object that cannot be used, based on methodological type rules according to the methodology of the graph structure, as a connectable object to the placed object through the created connection, such that any unfiltered object is presented as the allowable modification.

In yet another embodiment, the support further includes a filtering out of an additional existing object that cannot be used, based on semantic type rules according to the methodology of the graph structure, as a connectable object to the placed object through the created connection.

In a further embodiment, the support further includes providing a hint regarding an additional existing object that cannot be used, based on semantic type rules according to the methodology of the graph structure, as a connectable object to the placed object through the created connection.

In another embodiment, the action by the user is selection of a new or existing object for placement into a lane, and the support is at least one of a visual indication in a first presentation of the lane that the new or existing object can be placed into the lane and a visual indication in a second alternative presentation of the lane that the new or existing object cannot be placed in the lane, according to the methodology of the graph structure.

In yet a further embodiment, the support further includes presenting a hint in the lane or in an alternative lane that the new or existing object cannot be placed, based on semantic type rules according to the methodology of the graph structure, into the lane or the alternative lane.

Still in another embodiment, the action by the user is a selection of a new or existing object for placement into an existing object, and the support is a filtering out of an existing object into which the new or existing cannot be placed according to the methodology of the graph structure.

Still another embodiment is a non-transitory computer-readable medium storing instructions for executing for a method for presenting a graph structure as outlined above. The instructions, when executed by a computer, can cause the computer to perform one or more, or a combination, of the foregoing.

The purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 2 is a diagram illustrating a second conventional graph development tool that does not maintain graph integrity after deletion of an object.

FIG. 13 is a diagram illustrating cursor-indicated failure of placement of a new object within an existing objection in a conventional graph structure development tool.

FIG. 14 is a diagram illustrating a no-indicator failure of a placement of a new object within an existing object in a conventional graph structure development tool.

FIG. 18 is a diagram illustrating a catchpoint where an object can be inserted.

FIG. 20 is a diagram illustrating the effect of selecting an insert space option.

FIG. 21 is a diagram illustrating presentation of possible object option types for a selected connection.

FIG. 23 is a diagram illustrating semantic checks in a graph structure.

FIG. 25 is a diagram showing indications of appropriate and inappropriate lanes for new or moved objects.

FIG. 28 is a diagram illustrating invalid targets in a nesting operation, according to a meta model.

FIG. 30 is the pseudo code in "onObjectIsDeleted" which deletes an object in a graph structure.

FIG. 31 is the pseudo code in "tryToCreateNewConnection" which creates a new connection, and is referenced in "onObjectIsDeleted."

FIG. 32 is the pseudo code in "createNewConnection" referenced in "tryToCreateNewConnection."

FIG. 33 is the pseudo code in "getConnectionTypeFromUser" referenced in "tryToCreateNewConnection."

FIG. 34 is the pseudo code in "handleGraphicProperties" which takes over the handling of actual graphical properties.

FIG. 35 is the pseudo code in "getEdgesForObjectType" which delivers all possible connections that can be split, and on which the user can place an object.

FIG. 36 is the pseudo code for "objectTypeCanBeUsedToSplit" referenced in "getEdgesForObjectType."

FIGS. 37A and 37B show the pseudo code for "getObjectTypesForConnection" which provides a second use case where the implementation searches for all object types that could be used to split a connection in two.

FIGS. 38A and 38B present the pseudo code in "splitConnection" which implements the dual functionality requirements of selecting an object type and/or selecting a connection.

FIG. 39 is the pseudo code in "getConnectionTypes" referenced in "splitConnection."

FIG. 40 is the pseudo code in the function "createConnectionAndObject" referenced in "splitConnection."

FIG. 41 is the pseudo code in "startCreateConnection" related to creating new connections.

FIG. 42 is the pseudo code in "handleAllInvalidOppositeObjectForMetaModel" referenced in "startCreateConnection" which is the routine to change the display for objects found invalid in the meta model.

FIG. 43 is the pseudo code in "displayRuleCheckResults" referenced in "startCreateConnection" which is the routine to check the semantics of the graph structure for those objects that have not been filtered out yet.

FIG. 44 is the pseudo code in "placingNewObjectInToDiagram" for placing objects into the graph structure.

FIG. 45 is the pseudo code for "getLaneCells" which is the first step of acquiring "lane cells" referenced in the function "placingNewObjectInToDiagram."

FIG. 46 is the pseudo code in "displayMetaModelFeedback" referenced in "placingNewObjectInToDiagram" which changes the display of invalid target lane cells according to the meta model checks.

FIG. 47 is the pseudo code in "displaySemanticCheckHints," referenced in "placingNewObjectInToDiagram," which executes the semantic check for placing objects in lane cells.

FIG. 48 is the pseudo code for "placingNewEmbeddedObjectInToDiagram" which is the entry point for a nesting objects operation.

FIG. 49 is the pseudo code for "displayMetaModelFeedback," referenced in "placingNewEmbeddedObjectInToDiagram," which relates to changing the display of invalid target nodes according to the meta model.

FIG. 50 is the pseudo code for "displaySemanticCheckHints," referenced in "placingNewEmbeddedObjectInToDiagram," which is for executing the sematic check of nesting and/or embedding objects.

DETAILED DESCRIPTION

I. Glossary

Figure 1:
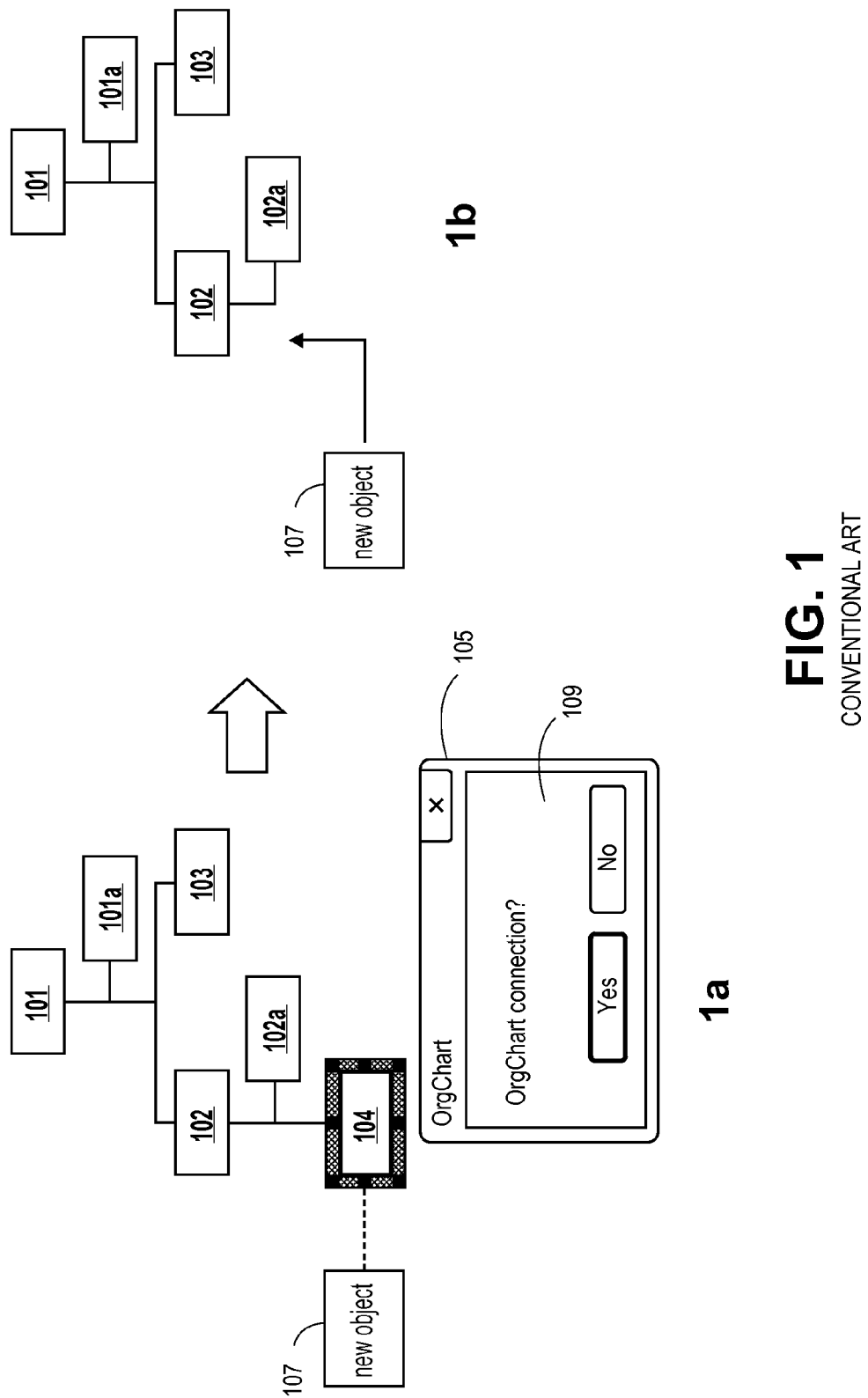
FIG. 1 is a diagram illustrating a first conventional graph development tool that does not maintain graph integrity after deletion of an object.

As used herein, a "graph structure" is a data structure, comprising nodes, which are connected via edges; edges may have directions, depending on the model type they represent; another term for "edge" in the art is "connection," and the terms "edge" and "connection" can be used interchangeably. As an example, in business processes graph structures, where activities are executed in a certain order (e.g., "activity A leads to event B"), the edges indicate the order in which execution occurs. In some graph structures, direction in the graph is not reflected in edges. For example, in some data models edges express a type of relationship between objects. The term "connection" is used extensively herein.

As used herein "methodology" is the meta model describing (1) which model types exist; (2) which object types are allowed in which model types; (3) which connections are allowed between which object types in which model type; (4) whether there are lanes in a model type, and if yes, which objects can be placed in each lane; and (5) which objects can be embedded (that is, nested) into which other objects.

As used herein, a "model type" describes which objects are allowed and which connections can be created between objects. As an example, the model type "organizational chart" describes the hierarchy of "organizational units." Thus, an "organizational unit" is an object type in the model type "organization chart." The hierarchy of the organizational units is expressed by the connections, e.g. "organizational unit A is superior to organizational unit B."

As used herein "flow" describes a graph structure having connections where the directions of the connections are important because, among other things, the directions of the connections affect the relationship between objects connected by connections with a direction. Flow is, for example, important in an event driven process where direction of the connections indicates the order in which activities are undertaken.

As used herein, "workflow engine" is a software system executing business processes as "workflows"; a workflow engine uses business processes as a model type; if a business process is broken, the process model is invalid and normally the business process cannot be used by the workflow engine; a workflow engine checks to see if a business process is broken before the business process is started. In practice, it is better to avoid the creation of invalid data from a broken business process, rather than attempting to cure deficiencies after a broken business process has started.

As used herein, "structure building connections" are connections between "event" objects and "function" objects; structure building connections describe a flow within a business process. In contrast, the connections between "function" and "attribute" objects, or "organizational units," are not structure building connections. These non-structure building connections describe an object, but do not describe any flow.

As used herein, a "catchpoint" is an indicator that the user can execute certain functionalities at that particular point. What functionality this actually is depends on the use case itself. As an example, if a catchpoint is shown on a connection in a graph structure that is presented to the user directly, if the user chooses creation of a new object, the catchpoint indicates that the user can place a new object at that catchpoint.

As used herein, a "connection segment" is a part of connection that has complex routing that goes beyond a start and end point. Multiple connection segments comprise a complex connection.

As used herein, "lanes" or "swim lanes" are areas in a model, expressed as columns or rows (or both, forming a table model), used to divide an available model space. Sometimes lanes do not restrict the object types that can be placed in the lane, but normally, they are used to organize the model in a way, that only objects of a certain type can be placed in a particular lane. An example of a swim lane is in the model type "process chain diagram" is where in one lane, only events are allowed, in another lane, only functions are allowed.

The term "real-time" (sometimes called "real time" or "realtime") as used herein means that the processor performs actions that keep the information provided to the user current with the data as soon as the data is changed; manual intervention by a user after the data is changed in order to cause the information to be updated and before the processor performs the real-time action is not required though it may be permitted. For example, a real-time visualization of information displayed on a screen calls for processing that continually updates the visualization of the information as the data upon which the information is based changes; in a real-time visualization of data it is not necessary for the user to cause the system to update the visualization to reflect updated data, even if the user is the cause of change to the data.

The phrase "automatically without user intervention" in a claim is defined to mean that the particular step occurs after the step is initiated until limitations recited in the step are finished without requiring a user to provide input to a processor.

Terms as used in this document and claims are intended to be interpreted first as understood to one skilled in the art in graphical tools and modeling, not only as a programmer of graphical tools and modeling but also as a highly skilled user of one or more of the products listed in Table 1 herein; second (if not interpretable by the first interpretation) within the context of information sciences; third (if not interpretable by the first and second interpretations) within the context of computer sciences; and finally (if not interpretable by the first, second and third interpretations), as interpreted by a more general dictionary.

II. Introduction and Overview

A. General

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

In overview, the present disclosure concerns computer systems which are designed to support a user in creating a graph structure. More particularly, various inventive concepts and principles are embodied in systems, devices, and/or methods for supporting a user which is creating a graph structure by performing error checking in real time during design of the graph structure. Error checking of different methodological types (meta model checking) may be performed in parallel at a given time. The results of the meta model checking may then be returned after semantic checks are finished. Although maintaining the graph structure normally leads to "trial and error" which may be quite cumbersome in a conventional system, the software system described herein can support the user in a way that is possible under consideration of the underlying meta model without resorting to "trial and error".

The embodiments described herein can support a user by restricting graph structure creation. Initially, methodological integrity of all graph structures can be maintained. Of course, even though methodological integrity is maintained, semantic integrity can also be ensured. Semantic checks ensure that no technical, economic, or other restrictions encumber a graphical structure object. In short, in some embodiments, meta-modeling checks and semantic checks can both be required.

Restrictions to create graph structures can be of the following types:

1.) Methodology

Since the methodology is the basis for all graphical structure given in some systems, the system can always maintain methodological integrity of the graph structure.

2.) Semantic Checks

Semantic checks define whether an object cannot be assigned due to other restrictions, such as technical, economical or other restrictions, even if the objects can be connected due to methodology.

Sometimes semantic checks exist to define how graph structures should be created due to guidelines; in other cases, business knowledge or technical restrictions are the cause for semantic checks.

Both check types, the one for the meta model and the one for semantic issues, can be combined together, and/or may be used separately.

Any object in a graph structure that can be inter-connected may be the subject of the above-described meta model and/or semantic checks. As is known, business processes describe an order of activities, responsibilities of involved persons, and organizational structures. Thus, as is known, business processes lend themselves to representation by a meta model with objects that can be connected to each other, and that can be placed in various lanes. The following example applications are provided by way of illustration, but not limitation.

Business process: With respect to a business process, as soon as a user starts to draw a connection from a first object, a system as disclosed herein can, based on a meta model, fade out all objects that cannot be connected to the first object. (The discussion herein sometimes refers to fade out, but it will be appreciated that grey-out, blurring, special colors, invisibility, and other techniques may be used on an element which is being displayed to visually notify the user that an element, although displayed, is not eligible for an action which has been initiated but is not yet completed.) Further, the system does not permit the user to try to connect objects which cannot be connected. This saves the user's time, since it can be impossible for the user to create invalid connections. The user need not search for a valid target object, as the valid choices are clearly presented for selection distinguishable from invalid choices.

In a business process, if the user deletes an object, the system can check whether the process flow can be kept consistent and intact. If the user selects a connection, the system can show which object or objects can be inserted in the flow of the connection. If the user starts to place an object, the system can show all regions where the object can be placed, for example, in lane model types or in nested objects.

Organizational charts: Organizational charts may also be represented with interconnected objects, as is known. Organizational charts describe hierarchies of business units and departments in companies. An object placed in another object indicates that both objects are semantically connected. An organizational chart meta model describes which types of objects can be placed in which other objects, as is known.

In the present system, with respect to organizational charts, as soon as a user starts to place a new object or move an existing one, the system can fade out all already existing objects which cannot contain the new (or moved) object. This saves the user time in that the possible "nested" relationships are clearly presented to the user and distinguished from relationships that are not possible. The user need not search for valid target objects.

Technical circuit boards: Technical circuit boards may also be represented with interconnected objects. In particular, certain components of a circuit, e.g. computer chips, transistors, resistors, etc. can or cannot be connected under various circumstances. Thus, an electrical engineer creating a circuit board will benefit from a meta-model with inter-connected components.

If an electrical engineer wants to connect an electrical device or element to another, as soon as the first element is selected, the system disclosed herein offers only possible target elements, or only possible source elements, depending on which way the structure being modeled is electrically switched. Further, in order to avoid damage in later production or usage of the circuit, the system can check which elements make sense to be connected. If the electrical engineer wants to insert a new electrical element, the system can indicate the areas, where this element can or cannot be placed.

City planning and highway construction: City planning may also be represented with interconnected objects. It can easily be seen that a city or a road map can be described using a graph structure existing of crossings and roads. In the system disclosed herein, if a user needs to plan a new road, all paths which cannot be used to build the road can be indicated as invalid ground, distinguishable from valid ground. The user would then clearly see which path the road can take. Additionally, if a building such as a hospital or fire station needs to be inserted into the map, the system could identify all regions where the building can or cannot be placed.

B. Principles

The system and/or method discussed herein may be based on the following principles.

1. A principle of the embodiments presented herein is to embrace plural conventionally separate actions taken by a user into a single action.

2. Another principle of the disclosed system is to support the user in understanding and using the methodology behind a graph structure. This can lead to more efficient modeling, including faster learning on the part of a user.

3. Another principle is to keep the graph structure valid and consequently to eliminate broken graph structures, which are of little or no value. Broken graphs will simply lead to errors.

4. A further principle is the immediate user support while developing graph structures. More particularly, the system can immediately show a user directly what options are available for selection during graph development based on current selections, rather than forcing the user to use "trial and error" after an action is complete to find out that a combination of selections resulted in an error. The system disclosed herein can allow a user to be directly informed, based on current selections, which objects can (and cannot) be placed onto a connection, placed onto another object, or placed into certain model areas, such as lanes.

C. Supported Actions

Expanding on the principles described above, one or more actions may be supported by the herein disclosed system implementing a modeling suggestion framework. The next paragraphs discuss example actions that may be supported, by way of example and not limitation:

Deleting objects and keeping graph structure intact
Splitting existing connections
Creating new connections
Placing (nesting) new objects 1. Deleting Objects and Keeping Graph Structure Intact The system can ensure graph structure integrity and consistency. Consider that if a user deletes an object in a flow, the flow itself becomes broken because some objects which were connected in the flow through the deleted object, are no longer connected after the object is deleted. As a result of deleting the object in the flow, the graph which exists consists of different parts which cannot be interpreted as a single flow, but must be interpreted as multiple flows. This leads to an inconsistent model. The user needs to reconnect the objects in order to fix the flow.

In a graph structure developed using a complex meta model, multiple connection types are possible. Thus if an object is deleted, for example in response to a user manipulation, the system can offer a list of possible connection types which are appropriate to the graph structure and may be used to recreate a single flow. Several small steps are conventionally taken by the user of a traditional system to achieve the deleting and reconnecting of adjacent objects; each of these small steps is initiated by a user: a) deleting the object; b) starting to draw the new connection beginning with a source object; c) creating the connection to a target object; and d) choosing the connection type. In comparison to the traditional system which requires several small steps, in the present system all of these steps can be embraced as a single, larger action initiated only once by the user.

2. Splitting Existing Connections

Another action that may be supported by the system is splitting existing connections, which can include inserting a new object onto a connection between two adjacent previously existing objects (called "adjacent" because there is a connection between the two objects and there is no object between the two objects). Splitting may be visualized as the new object being placed onto the existing connection between two existing adjacent objects. If a user wants to insert an object in between two other objects (called a "predecessor" and a "successor" with a connection "from" the predecessor "to" the successor), the following steps conventionally may be taken by the user: a) deleting the connection; b) placing the new object; c) starting to draw a first, new, connection from the existing predecessor; d) finishing creating the first new connection from the existing predecessor to a target which is used as a new successor object; e) choosing the (hopefully right) connection type for this first connection which is between the existing predecessor and the new successor; f) starting to draw the second connection from the new object, which will be a new predecessor; g) finishing creating the second connection from the new predecessor to the existing successor; and h) choosing the (hopefully right) connection type for the second connection, which is between the new successor and the existing successor. (The new successor of the first connection and the new predecessor of the second connection are the same object.) Each of these steps requires manual activity by the user. Conventionally, an inexperienced user is not fully aware of the meta model and consequently will use "trial and error" by selecting connections to determine which object can be placed with which connections.

In comparison, the embodiments disclosed herein can make the process above much easier. Specifically, the user can start by choosing an object type to place in the model; in response to the object type being chosen, the system can check all existing connections in the model, and can determine which of the existing connections the object type can be used to split in two ("divisible" connections). All of the existing connections that can be split by a chosen object type can be visually indicated by the system as divisible connections, for example, by displaying a special symbol or token on the divisible connections, by highlighting the divisible connections, and/or the like; and/or the existing indivisible connections can be visually indicated, for example, by hiding the indivisible connections, by filtering out the indivisible connections, by fading the indivisible connection, by displaying the indivisible connection as transparent, and/or the like. Preferably, the system changes the indivisible connections so that they are not selectable by the user. Then, the system can place an object having the selected object type in the model on a selected divisible connection in response to the user selecting one of the displayed divisible connections or dragging and dropping the object, or the like.

The above functionality also works for moving existing objects used to split connections. If a user selects/indicates an existing object in the graph, the system can visually indicate whether the object can be dropped onto a particular existing connection or not. If the object can be used to split a connection, this is indicated by a symbol on the connection or by other means.

Alternatively, if a user initially selects an existing connection, the system can show object types which can be used to split the connection, such as in a list which omits object types which cannot be used to split the connection. Then, by subsequently just selecting one of the object types indicated as usable to split the connection, such as by a click, the system can insert a new object of the selected object type on the selected connection between the previously connected objects, and the previous connection is now split. All the steps described above as conventional can be seamlessly integrated by the present system into two user actions.

3. Creating New Connections

Another action that may be supported by the system is creating new connections. In response to the type of new connection selected to be used, the system can filter out all objects which cannot be connected to each other through the type of new connection which was selected. Filtering techniques used to filter out invalid objects can depend on the user interface used to create the graph structure.

A new connection can be created, for example as follows. In a graphical user interface, a user can initiate an interaction by switching to a mode that is used to create a connection. The system can provide a display of existing objects to the user, and the user then may choose an existing first object from the display of existing objects. Thereafter, in response to the first object being selected, the system may cause (a) all objects in the display of existing objects that cannot be used as a target object for the first object that is currently chosen to be visually indicated as unavailable (an "invalid" object), such as by being "faded out," and/or (b) all objects that can be used as a target object for the currently chosen first object (a "valid" object) to be visually indicated as available. This means that the visual representation of objects in the display of existing objects can be changed during the creation of the connection, based on the currently chosen object, to provide a visual indication of availability/unavailability. For example, the invalid object is "greyed out" (that is, displayed in another color to indicate the different state), is "faded out" (that is, displayed as faded or semi-transparent), is caused to vanish completely from the display, or similar. The visual indication of each of the objects as available or unavailable can be updated in real time in response to a selection of a new currently chosen object. The display of objects as available or unavailable with respect to the currently chosen object, as different objects are chosen from time-to-time, can continue until the mode to create connections is terminated.

4. Placing (Nesting) New Objects

Another action that may be supported by the system implementing the modeling suggestion framework is the placing of new objects. In many meta models, an object can only be nested in certain lanes or swim lanes, or in certain other objects (so-called "swim-lane models"). When a user starts to place a new object in the graph structure, the disclosed system can react by fading out regions (or using other visual identifiers) to indicate where the new object cannot be placed. In this way, the user can easily see, before the object is placed, where the object can and cannot be placed. The user does not therefore need to use "trial and error."

III. State of the Art and Conventional Approaches

Numerous graphical tools exist on the market, providing the possibility to create drawings and models describing, for example, business processes and the like. The following table lists some relevant products and companies:

TABLE 1

| Company | Product(s) |
| --- | --- |
| Visual Paradigm | Logizian ™, Agilian ™ |
| SmartDraw Software | SmartDraw ™ |
| Microsoft | Visio ™ |
| Signavio | Signavio ™ Process Editor |
| Bizagi | Bizagi ™ Process Modeler |
| Microsoft | PowerPoint 2010 ™ |
| iGrafx | Process 2013 ™ |
| Adonis | Adonis Community ™ Edition |
| Bonitasoft | Bonita BPM ™ Studio |
| intellivate GmbH | IYOPRO ™ |
| Software AG | ARIS Business Architect/Designer ™, ARIS Express 2.4 ™ |

The present system has been conceived keeping in mind the disadvantages of these and other conventional graphical tools. The inventors' observations about these and other conventional graphical tools are included below.

Deleting Objects:

Many conventional software systems for developing graph structures intend on keeping the graph structure intact and valid. In most cases, the conventional programming will attempt to reconnect objects if an object is deleted. However, conventional software and systems do not support multiple connection types between two object types. Conventional programming therefore provides only a simple meta model that does not allow choosing a particular connection type.

Splitting Connections:

With respect to splitting connections, many conventional tools allow placement of objects on connections. However, no conventional tool provides the user with a list of all possible connection types which can be validly used for new connections. Furthermore, no conventional tool offers a collection of all possible object types which can be validly used to split the connection, once the user has selected a connection. Succinctly put, conventional approaches leave the user to create connections through "trial and error."

Creating Connections:

With respect to creating connections, conventional tools use only mouse feedback, or provide support for connection creation only after a connection is created. Conventionally, a user selects a start object, but the user is not provided with information regarding valid objects to be paired or connected via the connection being created. Furthermore, any information conventionally presented is not provided in an immediate manner when the user starts creating the connection. Conventionally, the user needs to hover over the objects to find out which objects are valid objects which can be connected via the connection being created. Again, conventional tools used in creating new connections are prone to "trial and error."

Creating New Objects, Nesting:

With respect to creating new objects using conventional tools, if a user places an object into a lane of a model, there is in most cases no feedback at all. A conventional system might provide minor cursor feedback notifying the user of an invalid combination after the new object and target object are both selected. For example, in a conventional system, the cursor may be changed if the user tries to place an object into an inappropriate lane. In a conventional system, if a user tries to place an object into a target object (that is, nesting), but the object cannot be placed inside the target object, there is only mouse feedback. Further this is true only if the user hovers the mouse over the existing object. For example, for BPMN (business process modeling notation) models, the conventional system changes the mouse cursor in response to the user trying to place an object into a lane for an object that cannot be placed in the lane.

In a conventional system, there will be occasions when the user successfully places a new object into another object. There will also be occasions when the placement of the new object into another object (nesting) is not successful. However, there is no feedback as to whether the new object is or is not successfully nested in the existing object. In these situations, the user will only be able to find out that the new object is not successfully nested into the existing object by moving the previously existing object and noticing errors. So also here, the user must engage in "trial and error" to determine successful nesting.

Semantic Checks:

With respect to semantic checks in conventional programs, for the user support mentioned above, semantic checks are not executed in real time. Rather, semantic checks are completed only after corresponding actions are finished. Succinctly put, conventional graph structure development tools are lacking in several areas that the embodiments disclosed herein address.

IV. Conventional Approaches and Relevant Disadvantages

A more detailed discussion of the failures in the conventional art and the promise of the various embodiments is now presented.

As discovered by the inventors during consideration of existing solutions, no support for complex meta models exists. Feedback is not given to the user in real time to indicate what is actually possible, but instead trial and error based on feedback after an attempted combination is necessary. Knowledge about possible objects and/or connections to be created and possible regions for creating objects is not used to provide support to the user.

A. Keeping Graph Structure Valid—Disadvantages

Figure 3:
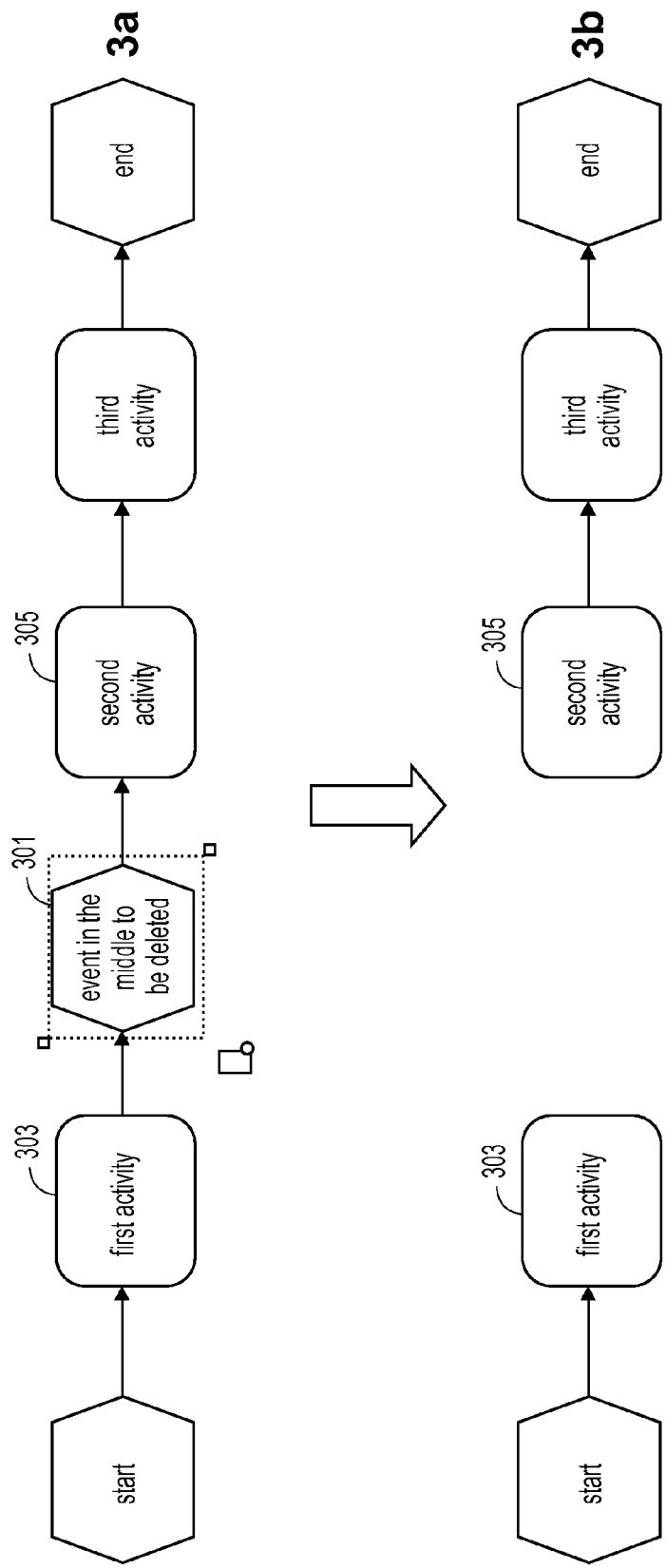
FIG. 3 is a diagram illustrating a third conventional graph development tool that does not maintain graph integrity after deletion of an object.

This section considers disadvantages of the closest art with respect to keeping the graph structure valid. Some conventional tools provide a very simple, rudimentary meta model. An example may be "Process 2013" from "iGrafx", considered in connection with FIG. 1 and FIG. 2. FIG. 3 considers the Signavio Process Editor as another example.

Reference is made to FIG. 1, a diagram illustrating a first conventional graph development tool that does not maintain graph integrity after deletion of an object. FIG. 1 comprises sequential Portions 1a and 1b. In this example, which illustrates a broken organization chart in iGrafx "Process 2013," an organizational chart is created. FIG. 1 illustrates a graph structure of connected objects 101, 101a, 102, 102a, 103. In Portion 1a, if a user wants to connect a new object 107, the system presents a dialog pop up 105 asking whether the new connection is an "OrgChart connection" (so called in iGrafx) or not. If the user chooses "No" 109, the object 104 maintains an "OrgChart connection" to the object 102, and maintains an ordinary connection to the new object 107.

As shown in Portion 1b, if the user later deletes the object 104, the system will not want to break the graph structure, but the connection type between new object 107 and object 102 will be ambiguous. Only if the connection type stays the same is the graph structure integrity maintained in the conventional art. In contrast to the conventional art, the herein disclosed system can instantly let the user decide whether the new object 107 should be connected to the object 102 via an "OrgChart connection" or an ordinary connection. By comparison, iGrafx does not keep the graph structure valid.

Reference is made to FIG. 2, a diagram illustrating a second conventional graph development tool that does not maintain graph integrity as an object is deleted. FIG. 2 comprises sequential Portions 2a and 2b and relates to a graph structure after deleting an object in BPMN using iGrafx "Process 2013." Portion 2a shows POOL 1 201 and POOL 2 203 that are connected, prior to deletion of "delete" object 209. Portion 2b shows POOL 1 205 and POOL 2 207 that are connected after the deletion of "delete" object 209. In Portion 2a, POOL 1 201 and POOL 2 203 are connected by a connection between object 211 and the delete object 209. In Portion 2b, subsequent to the deletion of "delete" object 209, POOL 1 205 and POOL 2 207 are connected by a connection between object 211 and object 213.

In FIG. 2, the second graph structure development tool happens to maintain the graph structure, so the remaining objects in POOL 1 205 and POOL 2 207 stay connected. However, there is no possibility of maintaining different connection types between two objects having certain types. In FIG. 2, the system simply detects which objects are connected, and draws the connections in another manner. In the particular case of FIG. 2, the subject graph structure happens to remain consistent, but this is not always the case. That is to say, the system of FIG. 2 by happenstance has a correct connection. The disclosed system ensures that the connection is correct.

In other conventional tools, even if a connection type is clear without ambiguity, the graph will still be broken and lose its integrity. This is a worst possible case, because there is no need for a break in the flow. Consider FIG. 3, which is a diagram illustrating a third conventional graph development tool that does not maintain graph integrity after deletion of an object. FIG. 3 comprises sequential Portions 3a and 3b, and shows deleting an object in a business process in the Signavio Process Editor.

In particular, Portion 3a demonstrates a business process that includes an event to be deleted 301. The event 301 is connected in the middle between a first activity 303 and a second activity 305. Portion 3b then shows the business process after the event to be deleted 301 is in fact deleted. There is no reason why, in Portion 3b, the first activity 303 should not be connected to the second activity 305. Although such a connection would appear to be fairly simple for a graph development tool to produce, in some conventional systems it simply is not.

B. Splitting Connections—Disadvantages

This section considers disadvantages of the closest art in the action of splitting connections. An example may be found in the graphical tool "Process 2013" from "iGrafx", considered in connection with FIG. 4 to FIG. 6. FIG. 7 considers the Signavio Process Editor as another example.

Figure 4:
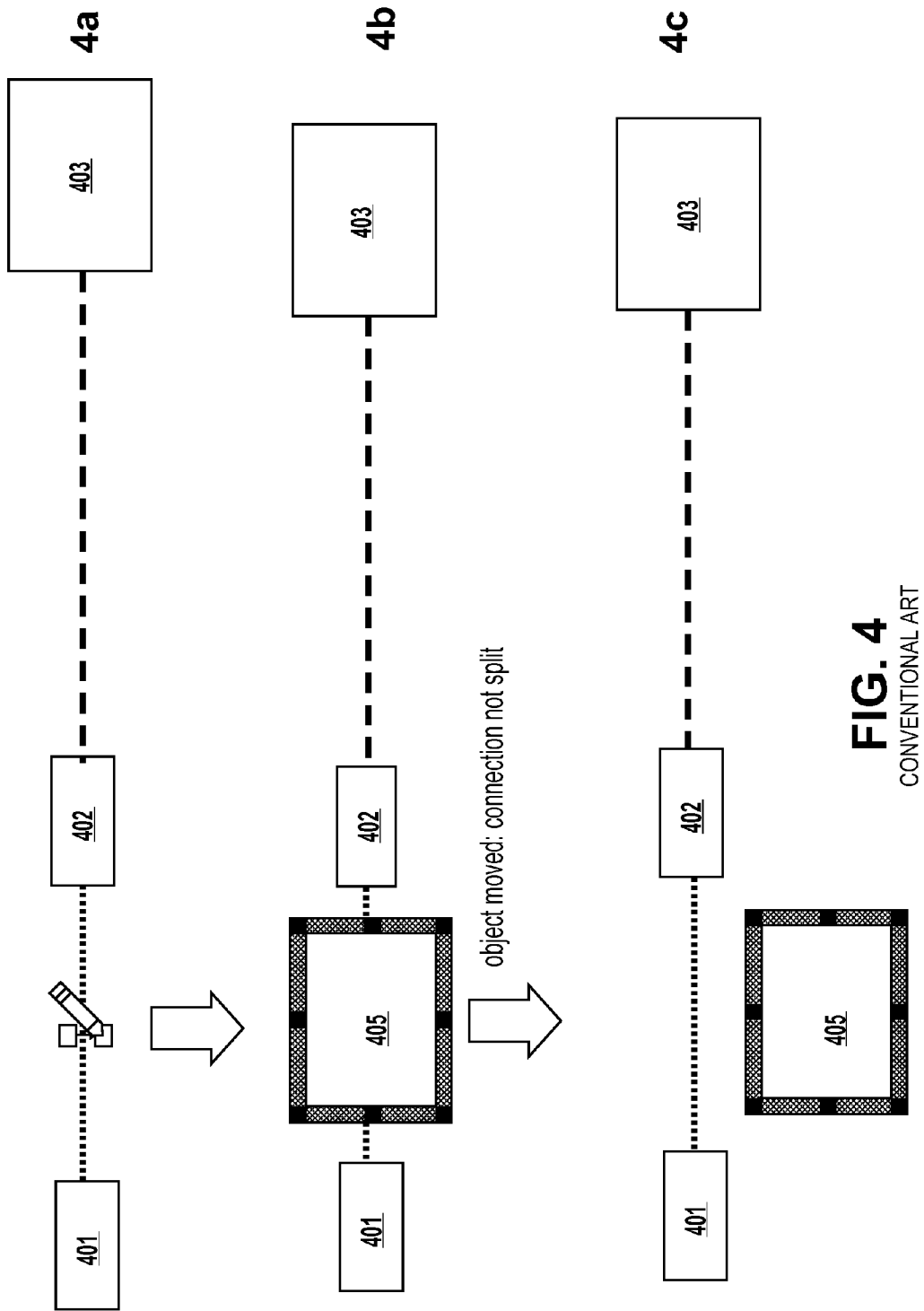
FIG. 4 is a diagram illustrating a conventional graph development tool that does not split a special connection after a new object placement.

Reference is made to FIG. 4, a diagram illustrating a graph development tool that does not split a special connection after a new object placement. FIG. 4 is after placing an object in iGrafx "Process 2013" onto an "OrgChart connection," and comprises sequential Portions 4a, 4b and 4c. Portion 4a demonstrates a conventional organizational chart graph structure that includes objects 401, 402, and 403. The objects 401 and 402 are connected by a special connection as indicated by the finely dotted line. The object 402 and the object 403 are connected by an ordinary connection as shown by the thick dotted line.

In Portion 4b, a user is attempting to connect a new object 405 between objects 401 and 402. In this conventional example, however, the system does not ask for a connection type. Even though there may be cursor feedback, the object 405 is not actually connected by a special connection between objects 401 and 402. This can clearly be seen in Portion 4*c* when the user moves the new object 405. The user would be surprised (and probably irritated) to find that a special connection was not split between objects 401 and 402 and then objects 402 and 404, and 402 is not made. The system in FIG. 4 simply placed, but did not connect, object 405.

Figure 5:
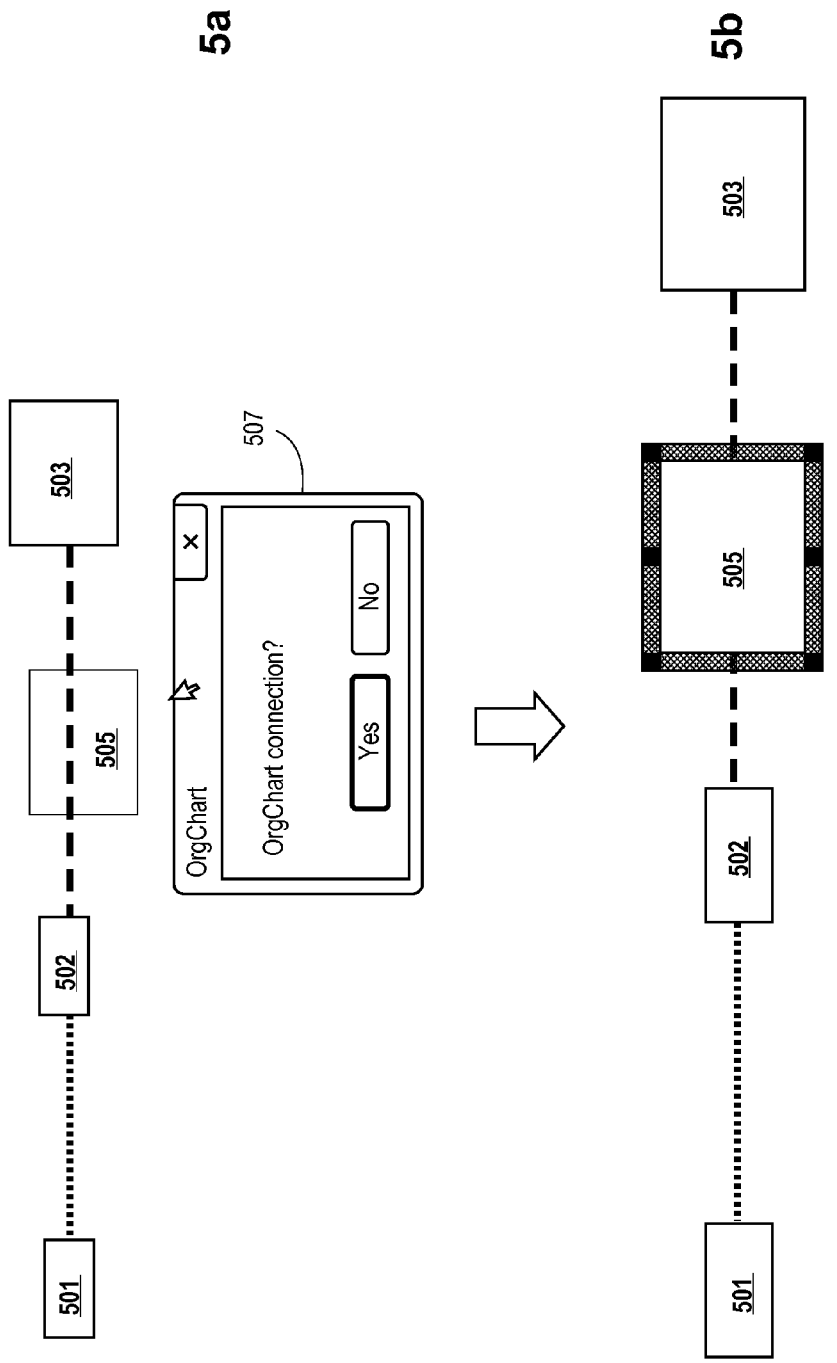
FIG. 5 is a diagram illustrating a conventional graph development tool that does not split an ordinary connection after a new object placement.

Reference is made to FIG. 5, a diagram illustrating a graph development tool that does not split an ordinary connection after a new object placement. FIG. 5 shows inserting an object onto an ordinary connection in iGrafx, and comprises Portions 5*a* and 5*b*. In Portion 5*a*, the ordinary connection is not between objects 501 and 502, but rather between object 502 and object 503. When the user attempts to connect new object 505 in an ordinary connection between object 502 and object 503, a pop up dialog box 507 asks the user whether an "OrgChart connection" that is a special connection should be created or not. If the user selects "No", which means that an ordinary connection type is used, the object is inserted as expected.

By comparison, if the user were to answer "Yes," the consequence is totally unclear. That is to say, if the user were to choose using an "OrgChart connection" instead of an ordinary connection, it unclear what would result. As illustrated in Portion 5*b*, there is now a connection between new object 505 and object 502 and a connection between new object 505 and object 503. Since two new connections, together with the new object 505, replace the old single connection between objects 502 and 503, which is not a special OrgChart connection, there is a question whether just one of those two new connections is a special connection. If only one is a special connection, then the question is which one; or it might be that both new connections are special connections. This problem in the conventional art is clear to see.

Figure 6:
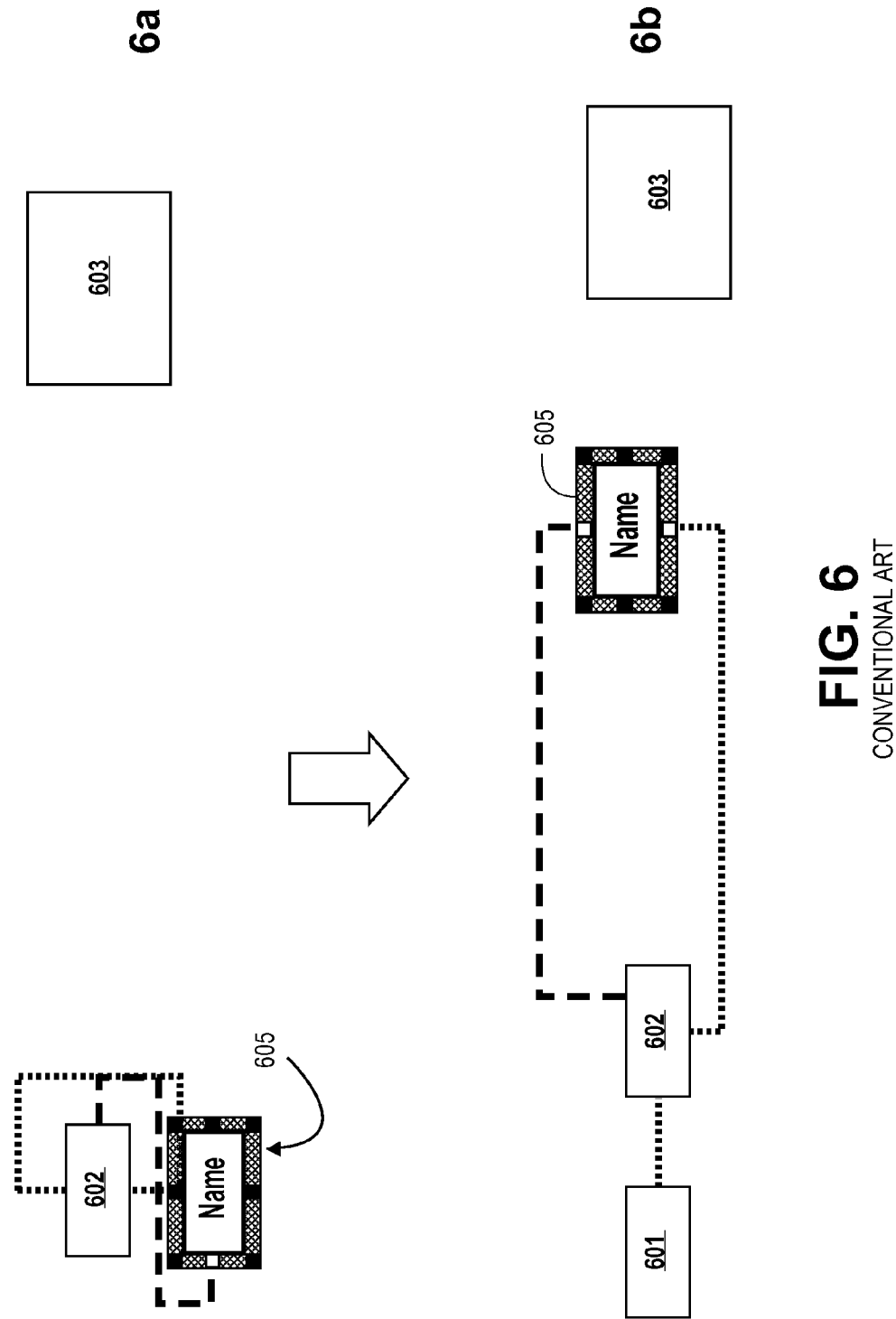
FIG. 6 is a diagram illustrating consequential repositioning that results from a conventional graph development tool that does not split an ordinary connection after object placement.
Figure 7:
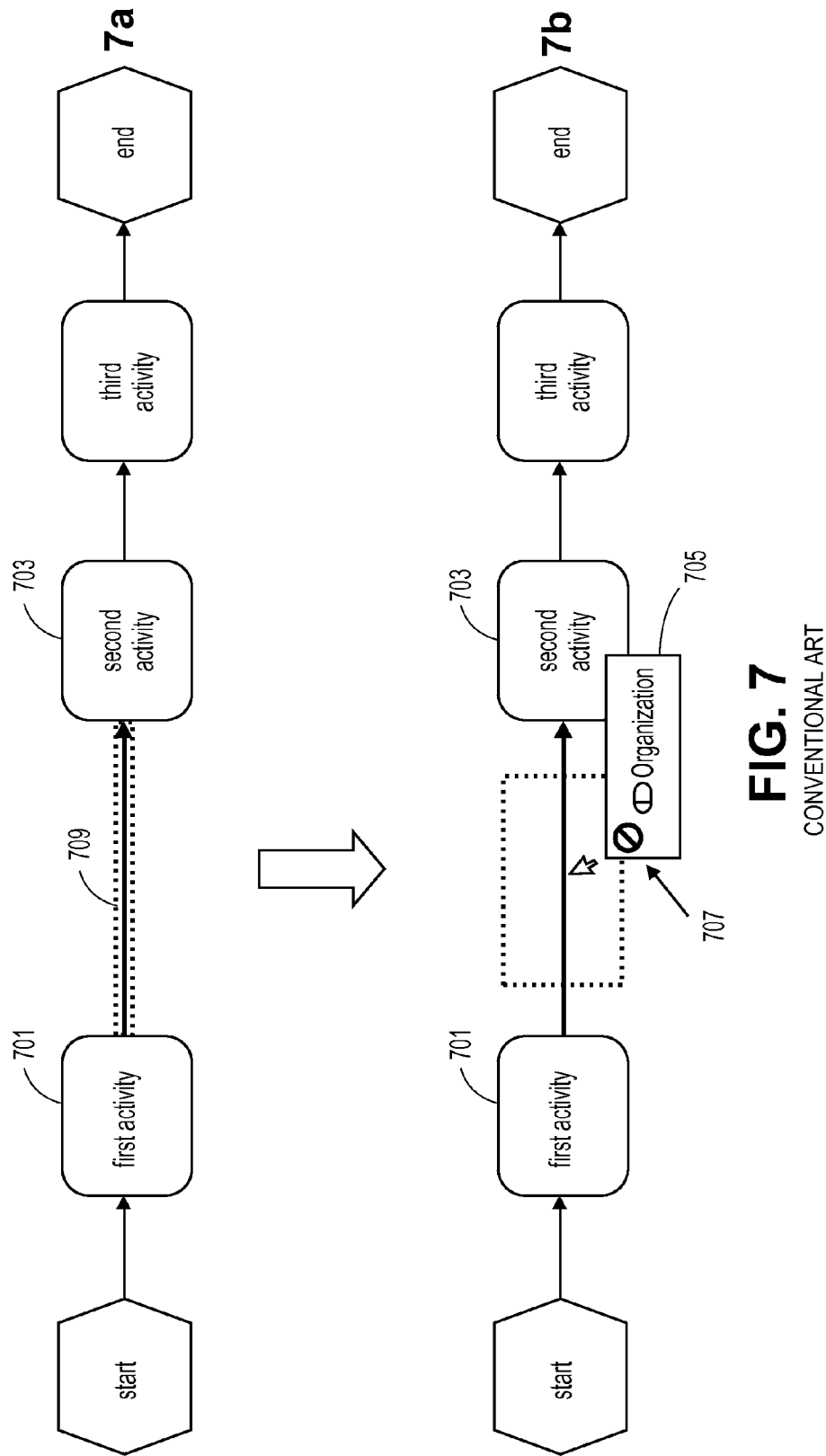
FIG. 7 is a diagram illustrating a second conventional graph development tool that does not satisfactorily split connections.

Reference is made to FIG. 6, a diagram illustrating consequential repositioning which results from a graph development tool that does not split an ordinary connection after object placement. Specifically, FIG. 6 illustrates a possible outcome in iGrafx from the uncertain connections seen in FIG. 5, Portion 5*b*. FIG. 6 comprises sequential Portions 6*a* and 6*b*. iGrafx does not seem to be able to do a proper layout in this case. In Portion 6*a*, it can be seen that the connection between objects 502 and 503 was not split at all. Portion 6*a* shows the new object 605 (renamed as "Name" object) is now disconnected from object 603. Additionally, both a special connection (indicated by finely dotted line) and an ordinary connection (indicated by the bolded dotted line) connect object 602 with the Name object 605.

Portion 6*b* illustrates the eventual repositioning and dual connection of object 602 with name object 605 that includes both a special connection (finely dotted line) and an ordinary connection (bold dotted line). Object 601 is also specially connected with object 602 as was seen in FIG. 5. Object 603 remains unconnected with Name object 605. This situation in the conventional art is clearly flawed.

Reference is made to FIG. 7, a diagram illustrating a second conventional graph development tool that does not satisfactorily split connections. FIG. 7 shows a Signavio Process Editor, and comprises sequential Portion 7*a* and 7*b*. Portion 7*a* illustrates a connection 709 that connects a first activity 701 and a second activity 703. The connection 709 can only be split by an event or another activity (also referred to as a function).

The system of course maintains information as to which objects can be inserted into the connection 709. However, the user is not cognizant of this information because the system does not provide the user with this information. The user thus must apply "trial and error" in determining what type of objects can be connected between the first activity 701 and the second activity 703.

As seen in Portion 7*b*, the user is attempting to split the connection 709 with an "Organization" object 705. As mentioned above, the conventional graph structure development tool of FIG. 7 allows events or other activities to be connected. Thus the attempt at inserting an organization object 705 in a conventional system results in a notification of an error, specifically, a "forbidden" cursor 707 being displayed. Instead of offering all possible types that can be used to split that connection (and not offering types that cannot be used), to find a type that can be used to split the connection the user must keep selecting and trying connections until the "forbidden" cursor is not displayed when the insertion is attempted. The necessity of "trial and error" in determining whether an object splits a connection makes the conventional approach burdensome.

C. Splitting Connections: Offer Possible Objects—Disadvantages

Figure 8:
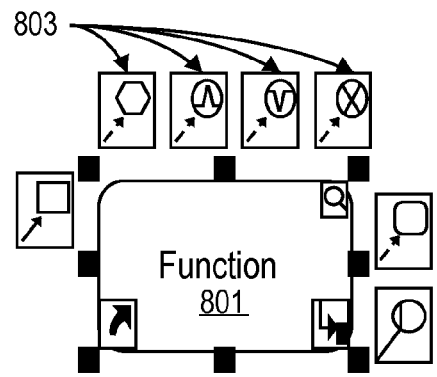
FIG. 8 is a diagram illustrating a conventional object that lists placement and connectivity in a conventional graph development system.

This section considers an exemplary conventional tool, namely Agilian (Visual Paradigm), which can provide a list of object types based on object selection, as illustrated in FIG. 8.

FIG. 8 is a diagram illustrating a conventional object that lists placement and connectivity in a conventional graph development system. The list-object 801 provides a list of object types 803 that can be connected with the list object 801. Although the conventional list-object 801 indeed does show some objects types 803 that can be used to "place and connect" the list object 801, there is still no disclosure of objects that can be used to split a connection as distinguished from those that cannot be used to split a connection. The herein disclosed embodiments resolve issues related to both placement and splitting of connections.

D. Creating Connections—Disadvantages

This section considers disadvantages of the closest art in the action of creating connections. The disadvantages are followed by examples of how current solutions work.

Separate issues arise in attempting to create a connection in a graph structure, rather than simply splitting connections. Succinctly put, conventional graph structure development tools simply do not conveniently support a user in creating connections. The user needs a longer time to learn the methodology used, and the user's behavior is prone to errors.

1. Disadvantages of Cursor Feedback and Semantic Checks

As mentioned previously, conventional tools at best provide a user with some sort of cursor feedback, and in some cases only provide feedback after creation of the connection.

1) Cursor Feedback—Disadvantages.

With the minimal (if any) guidance provided by conventional tools, it can be safely said that users are required to expend longer and longer periods of time learning connection creation using the trial and error method. Even where a rules engine maintains information related to which objects can be used opposite of a selected object, the trial and error method employed by the user is time consuming, and certainly frustrating.

In complex meta models, only a small subset of object types might be used to create a connection. Thus inexperienced users first need to find out which connections are possible. If a user starts to create a connection and chooses a first object, the filtering or fading out objects that cannot be used as an opposite connection creates a fast learning curve. An inexperienced user can be directly shown what can and cannot be created. These advantages are discussed in detail further below.

2) Semantic Checks—Disadvantages.

As mentioned above, many graph structure development tools support semantic checks to monitor a user's work. However, these checks are not automatic. Typically, the user expressly triggers these checks by hand, which is really of no value. A user can clearly forget to check, or only do so periodically. Similar to cursor feedback, a primary disadvantage of conventional semantic checks is that the user must first try to create a connection before determining whether the connection is correct or before receiving some warning. Conventional semantic error checks are both time consuming and prone to errors.

For example, imagine an electrical circuit where incorrect connections can cause damage to the electrical parts if the electrical power delivered exceeds a certain threshold. If the user does not trigger a check to examine possible incorrect semantic connections, clearly severe consequences can follow when the actual produced circuit is used. It is clear that the user designing the circuit needs a system providing support such that as few errors as possible are made.

2. Cursor Feedback and Semantic Checks—How Conventional Solutions Work

1) Cursor Feedback—How Conventional Solutions Work

Figure 9:
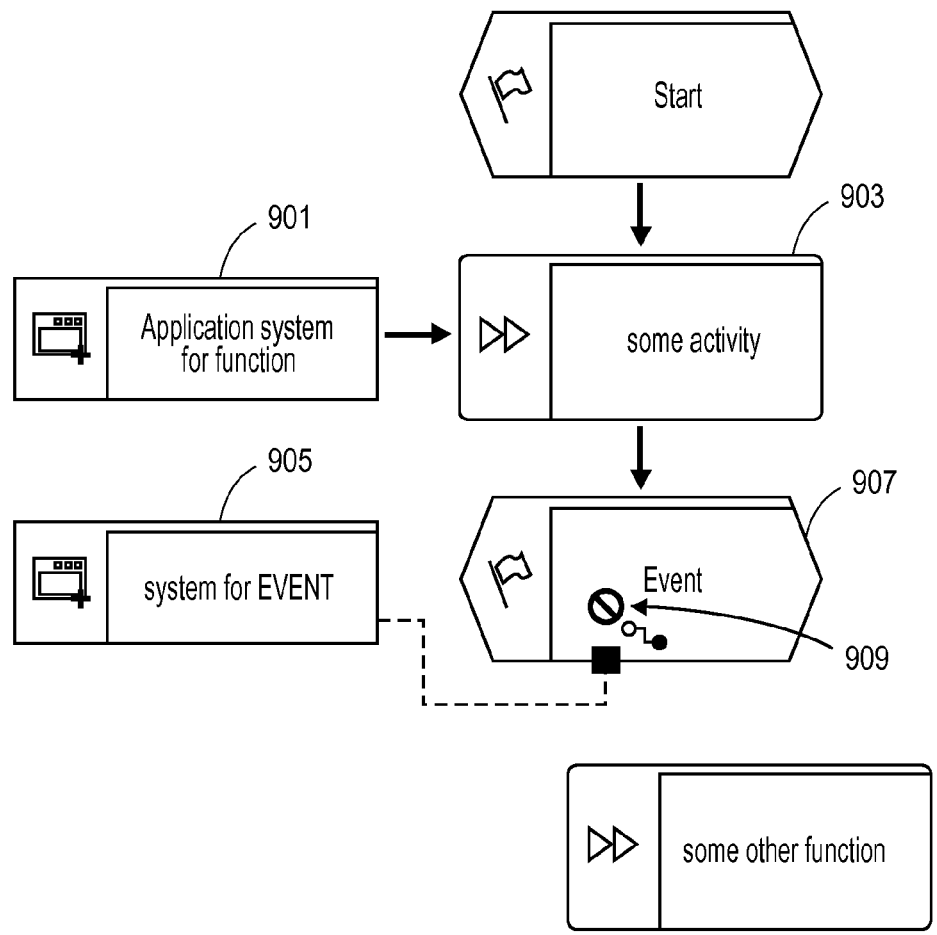
FIG. 9 is a diagram illustrating conventional cursor feedback when creating a connection.

Reference is made to FIG. 9, a diagram illustrating conventional cursor feedback when creating a connection. In this example, a user creates a business process using the ARIS methodology, using the EPC model type. The graph process structure of FIG. 9 is as the user has created it.

In FIG. 9, the "Application system" object 901 is successfully connected to "some activity" object 903. An inexperienced user without a substantial working knowledge of the methodology of the graph structure development tool may try to then connect the second "system" object 905 to the "Event" object 907, which will be assumed here to be not allowable. The feedback of the ARIS system is as follows. After the user creates a connection by connecting the "system" object 905 to the "Event" object 907, the user hovers the cursor over the "Event" object 907. The cursor then shows a "forbidden" sign 909, which indicates that creation of the connection is not possible.

In the conventional cursor example illustrated in FIG. 9, the user may not have had to search for a particularly long time. Nevertheless, very often, business processes are significantly more complex. Finding out which connections can, and which connections cannot, be created by trying the connections can be very time consuming, especially to a user who is not an expert concerning the methodology.

2) Feedback for Semantic Checks—How Conventional Solutions Work

Figure 10:
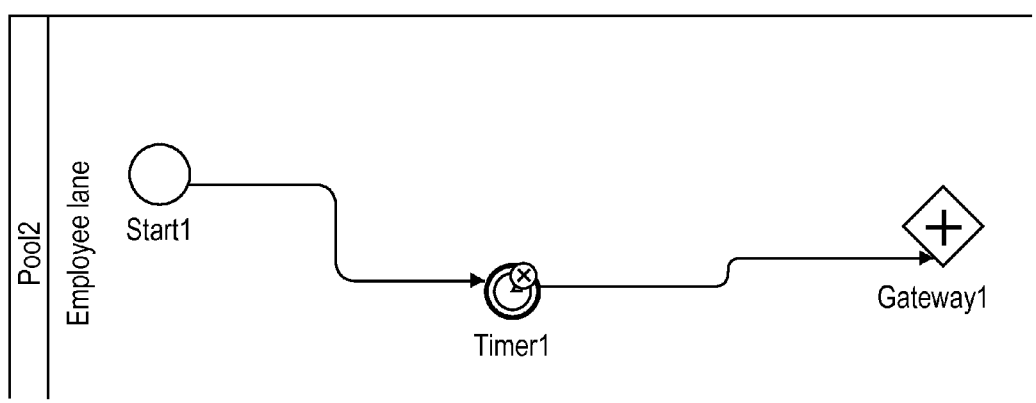
FIG. 10 is a diagram illustrating a semantic check performed by a conventional graphic structure development tool after creation of an item.
Figure 11:
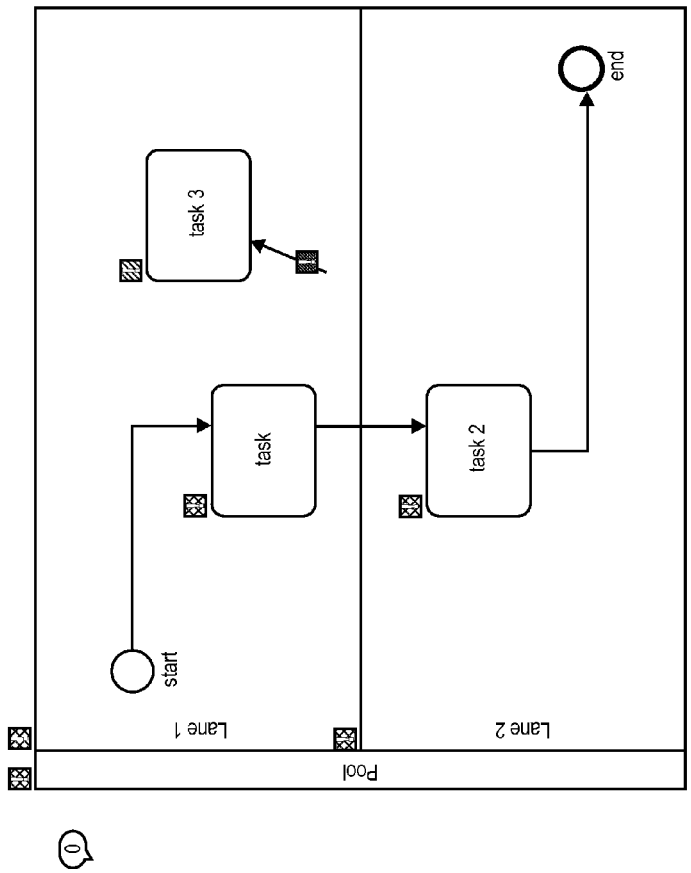
FIG. 11 is a diagram illustrating a semantic error check, after saving, in a second conventional graph structure development tool.

As discussed above, semantic checks are often used in conventional graph structure development tools. This section discusses, by way of example, the Bonita PM Studio (FIG. 10, and the Signavio Process Editor (FIG. 11).

Some conventional systems support semantic checks after creation of an item, or even later, after saving, or after a trigger, by the user. FIG. 10 is a diagram illustrating a semantic check performed by Bonita PM Studio, a conventional graphic structure development tool, after creation of an item. FIG. 11 is a diagram illustrating a semantic error check, after saving, in a second conventional graph structure development tool, the Signavio Process Editor. These examples show that conventional semantic support is prone to errors. In both systems, the user is able to create invalid data structures.

E. Placing New Objects—Disadvantages

As described above, if there is any feedback provided by conventional systems in placing new objects, the feedback is given only via mouse (cursor) feedback, or even after the object is created. The disadvantages are quite similar to those described above for other functionalities which also use cursor feedback only, and/or semantic checks.

Placing Objects in Diagrams Having Lanes.

Turning now to lane prohibition of object creation in conventional graph structures, it should be noted that conventional tools force the user to employ trial and error in determining lanes in which a new object can be created, or to which an existing object can be moved. A user will certainly find this to be time consuming and irritating. This is because in complex meta models, only a small subset of object types might be subject to particular placement in specific lanes. Furthermore, a model type may contain many different lanes. If a development tool shows all possible target lanes and all possible target objects, the learning curve for a novice user will be very high in attempting to place a new object (or moving an existing object) into a graph structure.

Figure 12:
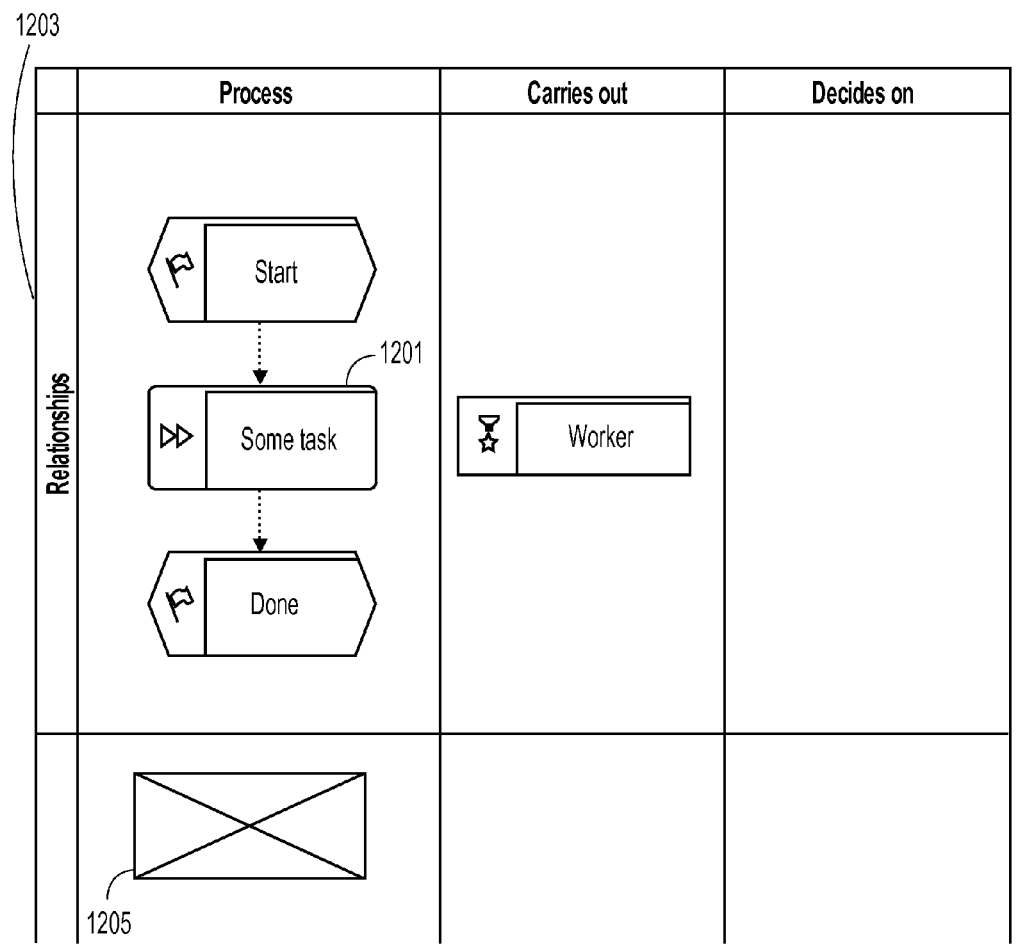
FIG. 12 is a diagram illustrating lane prohibition of object creation in a conventional graph structure development tools.

Reference is made to FIG. 12, a diagram illustrating lane prohibition of object creation in a conventional graph structure development tool. In this situation, a user creates a business process using "EPC (table display)", and then tries to place a new object having type "Function" below the last event (named "Done") outside of the horizontal lane named "Relationships". This is not allowed in the ARIS methodology. More particularly, in FIG. 12, a user attempts to place a new function object 1205 (that represents a function similar to a "Some task" object 1201) outside of horizontal relationship lane 1203. As the user attempts to place the function object 1205 into the graph structure by hovering the cursor, a prohibition sign such as a rectangular "X" appears in the function object 1205. This is how the tool shows that creation of the object or placing the object is not possible in this location.

The feedback of such conventional solutions is: first, the user selects an object type; next, in response to the user hovering over the lanes, the system displays a forbidden sign.

F. Placing Objects within Other Objects—Disadvantages

Conventional graph structure development tools also create problems for users when placing new objects within other objects. In most cases, the user is not supported at all. Typically, if the user creates a new object in the diagram, the new object is simply placed over an existing object. The new object is not embedded into an existing object, and the user is not informed in any way.

Reference is made to FIG. 13, a diagram illustrating cursor-indicated failure of placement of a new object within an existing object in a conventional graph structure development tool. In this example, the user created a diagram of the type "Business process diagram" using the Logizian™ software tool available from Visual Paradigm. FIG. 13 shows an object having type "Package" 1301 and an object having type "Diagram overview" 1305. The user was able to successfully nest the object of type "data" 1303 into the package object 1301. However, if the user attempts to place a new data object into the diagram overview object 1305, and it is assumed here that such a placement is not allowed by the meta model, cursor feedback would provide an indication 1307 that such a placement is prohibited. The Logizian tool provides only cursor feedback when the user moves the mouse over an existing object, if the user tries to place a new object. If the user moves an existing object over another object, no feedback is given at all.

It should be noted that many conventional development tools do not provide any feedback at all. That is to say if the placed object is not embedded into the "outer" object, the user is simply not informed whether an embedded relation between both objects is created or not.

Reference is made to FIG. 14, a diagram illustrating a no-indicator failure of a placement of a new object within an existing object in a conventional graph structure development tool. FIG. 14 shows moving the outer objects in which objects were embedded. This particular example is ARIS Express 2.4, model type "Organizational chart", in which in Portion 14a, the user placed two objects having type "person" into a role (embedded-relationship allowed) and in Portion 14b, into another object having type "person" (no embedded-relationship allowed).

Portion 14a illustrates that a user has attempted to place a first instance of an inner person object 1401 into a role object 1405. Further, the user has attempted to place a second instance of an inner person object 1401 into an outer person object 1407. During placement of the instances of the inner person objects 1401, the conventional development tool provides no feedback. Thus, the user is not informed which object is embedded into the outer one.

As seen in Portion 14b, when the user moves the role object 1405 out, the user can see that the inner person object 1401 was successfully placed. Portion 14b also shows that only when the user moves outer person 1407, the user can then see that the inner person 1401 has not been successfully nested. The fact that a user may not even know that an object is not nested can create problems in modeling and in corresponding real-life operations.

G. Semantic Checks—Disadvantages.

The disadvantages for semantic checks are similar to the other functionalities, such as creating connections, described above.

H. Summary: Difficulties of Conventional Art

A summary of issues and difficulties in conventional art is now provided.

1. Deleting Objects (Keeping the Graph Structure Valid)

When deleting objects, conventional tools attempt to maintain the integrity of a graph structure, as long as the meta model is simple. As soon as there are multiple types of connections to be considered, however, the graph structure will become broken. This leads to additional work for the user, or even sometimes an invalid model will result.

2. Splitting Connections

With respect to splitting connections, as long as the meta model is simple, inserting objects on connections is supported by conventional systems. However, there is no solution available that allows the user to insert an object onto a connection, and then select the type of connections for the new connections. Further, there is no solution that, based on a selected connection, provides only all of the possible object types that can be used to split a connection.

3. Creating New Connections

With respect to creating new connections, conventionally the user needs to find out possible object combinations by "trial and error." Existing rules engines in meta models are not provided to a new user as support.

4. Placing New Objects

With respect to placing new objects, there is insufficient support in conventional systems to the user related to demonstrating successful nesting of objects into other objects. Often times the user is simply not informed of a failure.

V. Concept and Representative Embodiments

The solutions of the herein disclosed embodiments are now discussed in more detail, by way of example, and are intended to address the foregoing and other disadvantages of conventional systems.

A. Deleting Objects in Flow

The solutions of the system disclosed herein are now discussed in more detail. Initially, handling deletion of objects in a flow is considered. As discussed above, maintaining the integrity of the graph structure must be ensured when an object is deleted. This is sometimes also known as keeping the graph structure "upright."

The system disclosed herein handles deletions differently depending on the available connection type that exists between two objects remaining after the deletion. In some situations, the system will not offer a connection type for the user to select, but will maintain the connection, and still ensure graph structure integrity. In other cases, additional input by the user will be prompted.

A first situation where a connection selection is not needed from the user is where the object which should be deleted has exactly one structure building incoming connection and exactly one structure building outgoing connection. Additionally, only one structure building connection to connect the remaining objects must be possible. Under such conditions, no selection by the user is required because only a single type of connection is possible.

Figure 15:
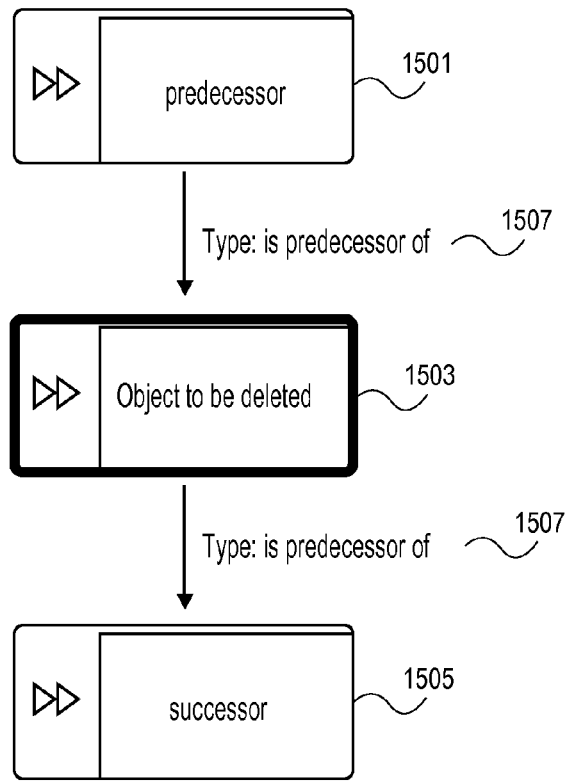
FIG. 15 is a diagram illustrating deletion of an object where connection selection is not necessary.

Reference is made to FIG. 15, a diagram illustrating deletion of an object where connection selection is not necessary. Specifically, FIG. 15 illustrates an object to be deleted 1503 that is connected between a predecessor object 1501 and a successor object 1505. It should be assumed the object to be deleted could be connected by multiple possible connection types to the predecessor object 1501 and multiple possible connections types to successor object 1505. However, where the connection type 1507 between the predecessor object 1501 and the deletion object 1503 and the connection type 1507 between the deletion object 1503 and the successor object 1505 are the same ("is a predecessor" connection), this in-use connection type 1507 ("is a predecessor" connection) may be reused. No further selection by the user is necessary.

Figure 16:
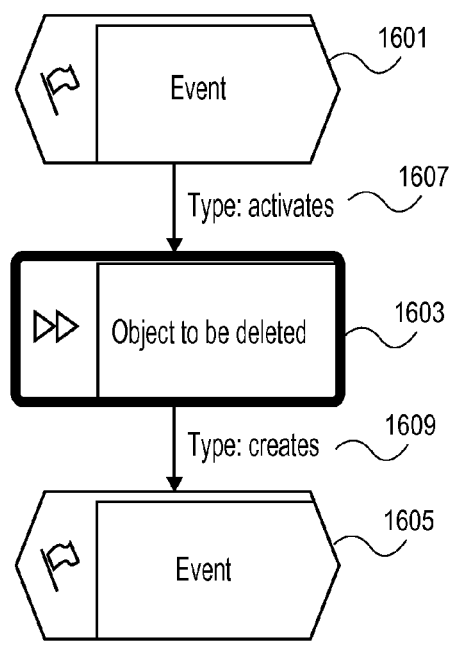
FIG. 16 is a diagram illustrating a condition where connection selection is required.

Other than in the two instances mentioned above, situations involving deletion of an object may require the user to select and define a connection type to maintain graph structure integrity. Reference is made to FIG. 16, a diagram illustrating a condition where connection selection is required. FIG. 16 shows that an object to be deleted 1603 is connected to an event object 1601 by an activates type connection 1607 that is different from a creates type object 1609 that connects the object to be deleted 1603 and the event object 1605.

Even if both of the activates type connection 1607 and the creates type object 1609 could connect the event object 1601 and the event object 1605, the user would still have to select which of the two connections would be satisfactory. However, it cannot simply be assumed that multiple alternative connection types are possible for the objects in FIG. 16. For example, the connection type "activates" may not be possible between the event object 1601 and the event object 1605.

Figure 17:
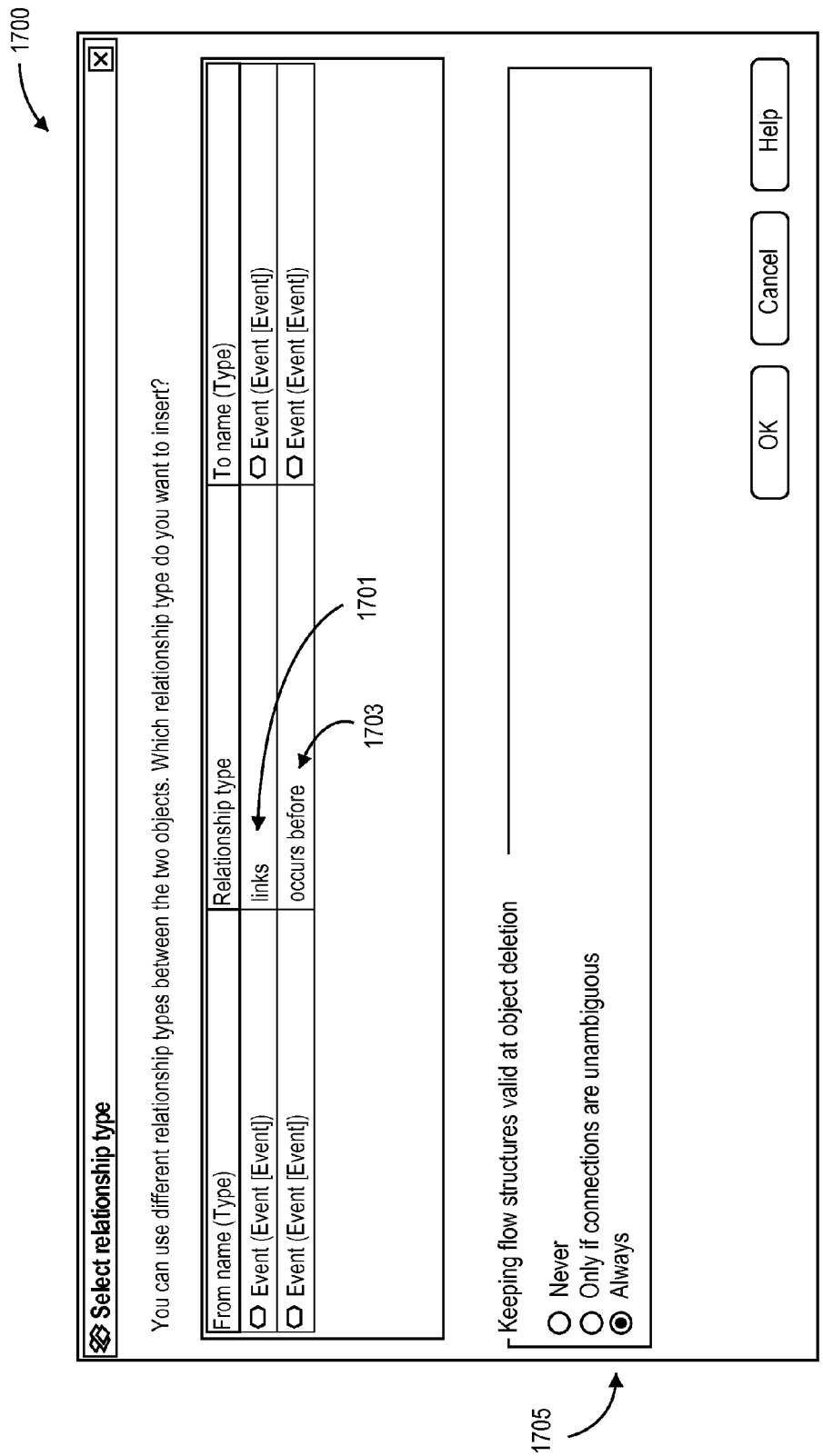
FIG. 17 is a screen shot of a dialog box which presents connection type options when deleting an object.

Reference is made to FIG. 17, a screen shot of a dialog box 1700, which presents connection type options when deleting an object. The dialog box 1700 can be used as soon as an object connected between two other objects is deleted and a connection type must be selected. The dialog box 1700 presents connection type options to be used for a new connection between objects.

The connection type options presented in the dialog box 1700 include options that define how the system should behave in order to maintain graph structure integrity. According to dialog box 1700, the connection type "activates" is not a possible connection type between the event objects 1601, 1605 in FIG. 16. This is because an "activates" connection is not shown as an option in the dialog box 1700. Instead, the two connection types "links" 1701 and "occurs before" 1703 are possible connections between two event type objects. The user selects a connection type from among those presented, all of which are valid connections between the two event type objects.

FIG. 17 also illustrates user selection 1705 of a level of provided support related to maintaining graph structure integrity. These options include "Never", "Only if connections are unambiguous", and "Always." When the "Never" option is selected, the herein disclosed system does not work to keep the integrity of the graph structure maintained. When the "Only if connections are unambiguous" is set, the connection is made only when the two connections are equal, as in FIG. 15. Lastly, when "Always" is selected, the system always tries to create a connection, whenever connection types between predecessor and successor are allowed.

B. Splitting Connections

As briefly described above, when a user places a new object, or moves an existing object, the system can suggest to the user the appropriate connections to use. This can be performed in various ways. Initially, the system can highlight the possible connections that can be used or can hide the connections that cannot be used. An advantage of this approach is that a user can place an object on each connection segment in a complex routing.

Catchpoints can also be used to aid a user in placing a new object or moving an existing object. Reference is made to FIG. 18, a diagram illustrating a catchpoint where an object can be inserted. FIG. 18 includes sequential Portions 18*a* and 18*b*. As seen in Portion 18*a*, as soon as a user starts to create a new object 1805, the system presents a catchpoint 1803 to show the user that the object 1805 can be inserted into the corresponding connection. It is clear that visual feedback is quite important. When the user navigates to the catchpoint 1803, the system indicates via such a visual feedback (such as an arrow and a highlighted or colored point) that an object can be executed at this very catchpoint 1803.

As indicated in Portion 18*b*, once the newly inserted object 1805 is placed at the catchpoint 1803, the object 1805, the catchpoint 1803, and the connection 1807 are all visually indicated to have completed the insertion at the catchpoint 1803. The advantage of using a catchpoint as illustrated is that the visual indications are quite friendly. However, the system may not provide a catchpoint at every available connection segment, because showing each catchpoint on every connection segment might make the graph structure look "overloaded".

1. Multiple Connection Types

Figure 19:
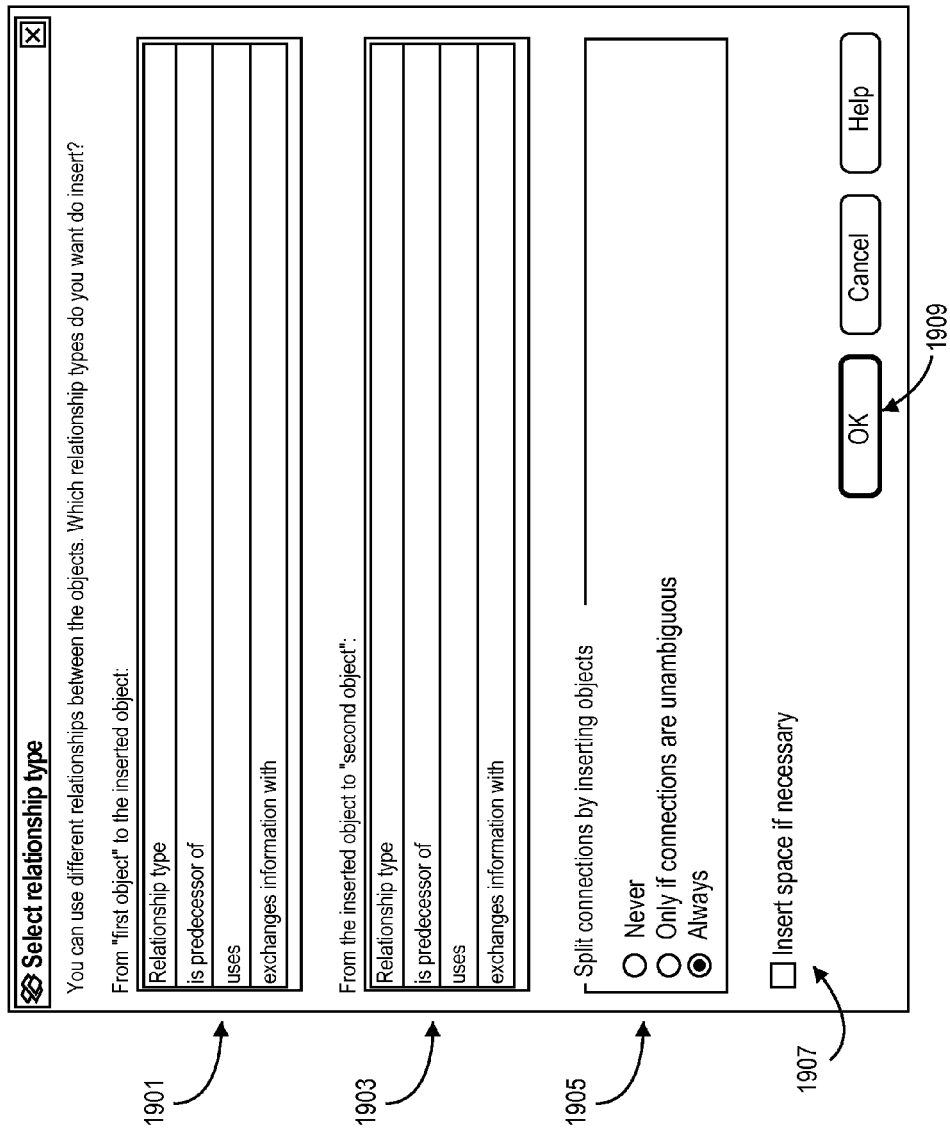
FIG. 19 is a screen shot of a dialog box which presents connection type options for splitting connections.

The embodiments disclosed herein can provide a mechanism for choosing, by a user, a particular connection type when multiple connection types can be used. When a connection is split by a new object, two new connections are created. The user thus may choose two connection types. The options offered define the situations in which splitting the connection with a new object may be possible Reference is made to FIG. 19, a screen shot of a dialog box, which presents connection type options for splitting connections. In FIG. 19, a first prompt 1901 addresses a connection between a first object and a new, inserted object. The first prompt 1901 asks whether the new connection between a first object and a new, inserted object should be of the following relationship types: "is a predecessor of", "uses", and "exchanges information with." A second prompt 1903 addresses a connection between the new, inserted object and a second object. The second prompt 1903 also asks whether a new connection between the new, inserted object and a second object should be of the following relationship types: "is a predecessor of", "uses", and "exchanges information with." As indicated above, the options offered define the situations in which splitting the connection with a new object should be possible. These options thus provide the novice user support and information in decisions related to inserting a new object FIG. 19 also demonstrates user selection 1905 of the level of provided support. The user can select "Never," where support for splitting connections is switched off. The user can select "Only if connections are unambiguous" where splitting a connection by placing an object onto it will only be performed if the connection type is unambiguous. In such a case, providing a dialog to choose the connection types is not necessary. The user selection 1905 of the level of provided support also includes an "Always" selection where whenever multiple connection types are possible, at least for one of the two connections, the dialog box of FIG. 19 appears.

FIG. 19 also demonstrates that in a complex meta model, connection types may have an "order," which describe their importance or priority. The connection types having the highest priority may be presented in a preselected manner. If the user agrees with the preselected manner, he or she need only press the "OK" button 1909 in order to affirm the preselected connection types.

It should be noted that FIG. 19 also includes a check box 1907 that allows a user to add space to a graph structure. The option to insert space may be used to increase the layout of the graph after placement of a new object. Such a modification to the graph structure may make it easier for a user to see and adjust the graph structure.

Reference is made to FIG. 20, a diagram illustrating the effect of selecting an insert space option. FIG. 20 has sectional Portions 20*a* and 20*b*. Portion 20*a* shows a catchpoint 2007 on a connection between function object 2003 and function object 2005. The insert space check box is assumed to have been selected such that the additional space rightward has been added. Portion 20*b* illustrates that a new function object 2001 has been added between the function object 2003 and the function object 2005 at a point where the catchpoint 2007 previously existed.

2. Determining Object Types to be Inserted

As discussed above, there is no conventional system that offers a list of only possible (valid) object types to split a connection when a connection in the graph structure is selected. The herein disclosed system uses information from the meta model to determine all object types which can be used for a particular connection. These object types are presented to a user as soon subsequent to a connection being selected by the user.

Reference is made to FIG. 21, a diagram illustrating presentation of possible object option types for a selected connection. FIG. 21 includes sequential Portions 21*a* and 21*b*. As seen in Portion 21*a*, the user has selected a connection 2101. Instantly, the disclosed system offers a list 2103 of different object types that could be used to split the connection 2101. It should be noted that in the example of FIG. 21, it is assumed that when the connection type is unambiguous a dialog box similar to that seen in FIG. 19 would be shown. As seen in Portion 21*b*, an IT function object 2105 has been selected from the list 2013, and splits the connection 2101.

The system generally can support splitting connections when the user places a new object in the graph structure. The system can support splitting connections when an existing object in the graph structure is simply moved. An existing object can thus also be placed between two other objects.

C. Creating Connections

As discussed above, the conventional art fails to adequately support connecting objects based on a meta model. As discussed further below, semantic rules for modeling may be considered. Some concrete examples of how the disclosed system may provide user support related to both meta model and semantic rules will be provided.

Figure 22:
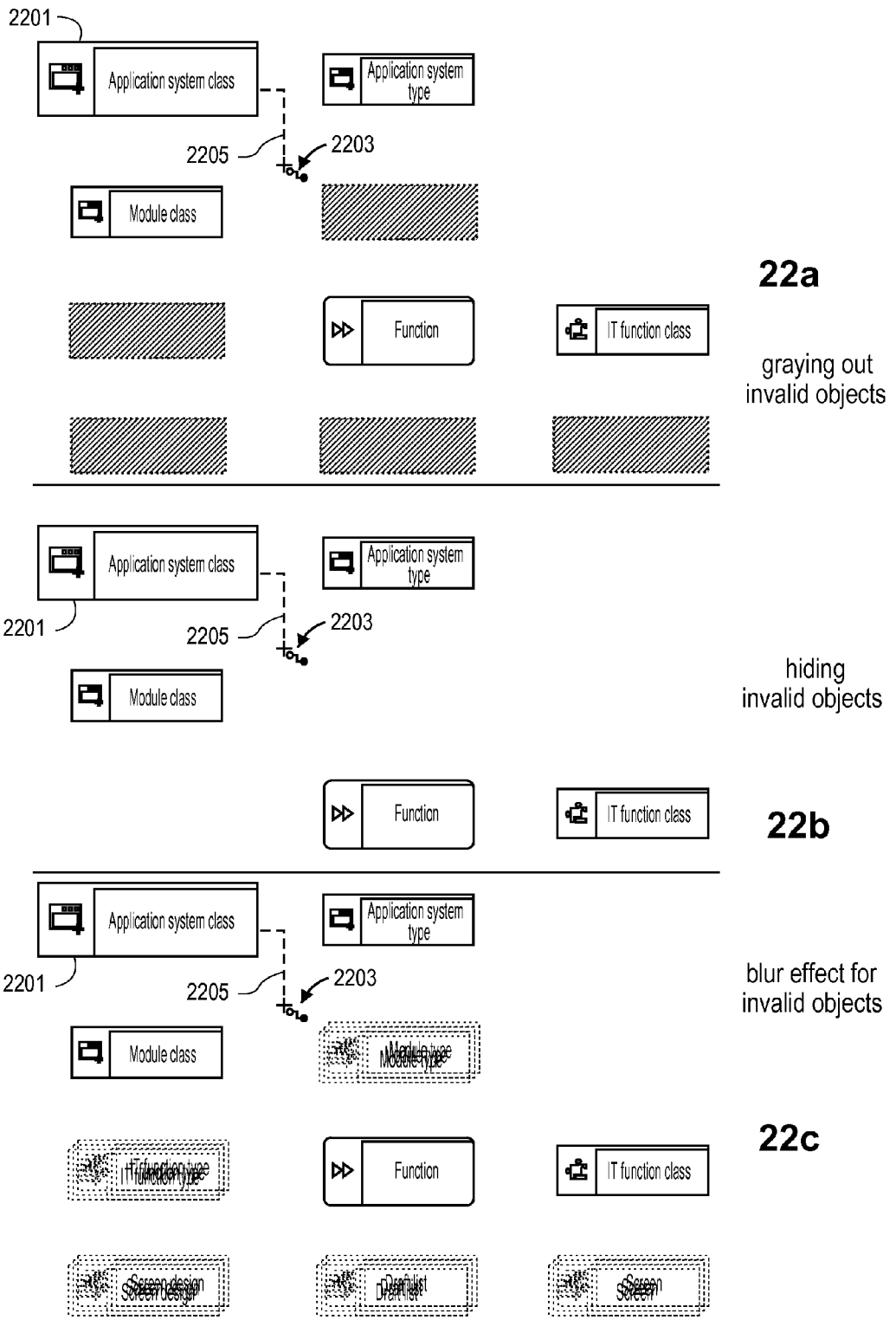
FIG. 22 is a diagram illustrating presentation of possible object option types for a selected connection.

Reference is made to FIG. 22, a diagram illustrating a mechanism for distinguishing invalid objects. FIG. 22 comprises sequential Portions 22a to 22c. FIG. 22 shows an object 2201 on the upper left side that has been added to the graph structure. A connection 2205 is extended from the "Application system class" object 2201. Conventionally, since the user does not know which objects can be connected, the user will just create a connection, and search for possible target objects.

Fortunately, as soon as the user starts a "create connection mode," the system can support the user by filtering out all objects that cannot be used as connectable objects. There are multiple ways of "filtering out" the unconnectable objects, and multiple possibilities will be appreciated by one of skill in this area, depending on the degree of the visible differentiation between valid and invalid objects that is needed.

As seen in Portion 22a, the user has created a connection 2205 from the "Application system class" object 2201 so the connection preview is shown. Additionally, the mouse cursor 2203 indicates that the "create connection mode" is active. The graying out of invalid objects is a good compromise between a good visual impression of invalid objects, and implementation effort. The grayed-out objects are still visible, but yet the user is clearly informed that they cannot be used as target objects for the new connection.

As seen in Portion 22b, the invalid objects can be completely hidden from the user. Hiding objects makes it explicitly clear what objects are available to be connected. Additionally, hiding objects is also very easy to implement. However, hiding invalid objects completely, as seen in Portion 22b, can be somewhat irritating to the user.

As seen in Portion 22c, another alternative of presenting invalid target objects is the fading out of invalid target objects. In practice, the colors of the invalid objects are actually brightened, and then a "blur" effect is used. An advantage of this implementation is that the presentation of the valid and invalid objects might be considered as pleasant looking. However, such a pleasant look is more resource inefficient.

Other possible ways to indicate that a target object is invalid will be appreciated by those of skill in the art based on these examples.

1. Semantic Checks

In addition to checking for meta model issues, semantic check can be triggered related to prospective object connections. Reference is made to FIG. 23, a diagram illustrating semantic checks in a graph structure. FIG. 23 includes sequential Portions 23a and 23b. FIG. 23 assumes that an object 2305 of type "function" can only be connected to a single object, for example an "application system type" object 2303. As a consequence, the object 2305 of type "function" in the middle of the model seen in Portion 23a cannot also be connected to the "application system class" object 2301.

If the user attempts to create a connection from the application system class object 2301, not only is the meta model considered, but also all rules, which are defined as a semantic checks for this model type, are considered. Thus, not only are the prohibited objects from FIG. 22 again prohibited in the current example, but so too is the function object 2305. Thus as seen in Portion 23b, all objects except module class object 2307 and IT function class object 2309 are blurred, so as to remove these target objects from consideration of being connected with application system class object 2301. It should also be noted that not only is the object causing the conflict with the semantic check (the function object 2305) faded out, but so is the connection 2312. This is done in order to lead the user's concentration onto only the valid objects for creating the connection.

Figure 24:
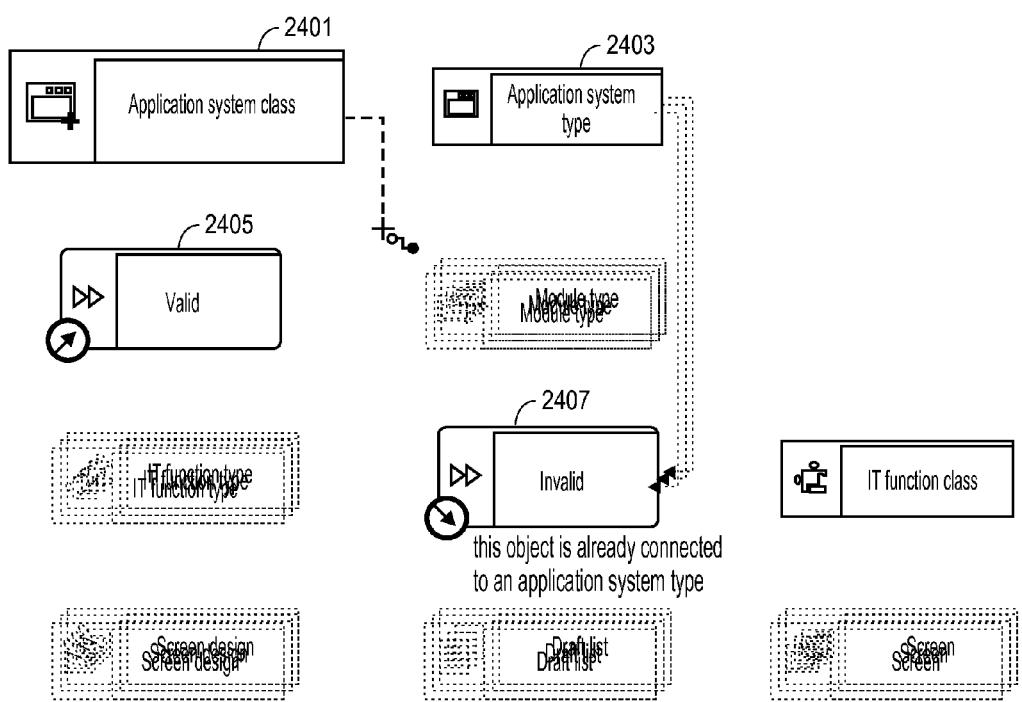
FIG. 24 is a diagram illustrating additional semantic checks in a graph structure.

There can be further semantic checks that can be performed over those described previously. Reference is made to FIG. 24, a diagram illustrating additional semantic checks in a graph structure. Specifically, FIG. 24 illustrates a development tool that does not fade out objects due to the result of an instant semantic check, but rather gives additional hints with explanations about the result of the semantic checks.

FIG. 24 assumes a rule similar to that of FIG. 23 which defines that function-type objects 2405 and 2407 should be connected to only one other object. However, in contrast to FIG. 23, the rule assumed in FIG. 24 can be bent. That is to say, the one connection prohibition in FIG. 24 is merely a recommendation, but not an exact requirement.

Thus in FIG. 24, the invalid function-type object 2407 is not blurred out with the other objects that cannot be connected with the application system class object 2401. Rather, the user is informed that the function-type object 2407 "is already connected to an application system type," for example via a dialog pop-up. Thus a user is informed of a recommendation against a double connection, but is still given the option to decide in a manner contrary to the rule. Thus instead of fading/hiding objects, FIG. 24 provides a notification of the rule and optionally a reminder or recommendation that is shown according to the semantic check rules.

As should be clear, whether hints will be shown to the user depend on the rules for the semantic check and their results. The result of semantic checks can be divided into multiple categories. Depending on the category, different actions can be taken: fading out, giving a warning, or even giving an affirmative recommendation for objects to connect.

An example of where an affirmative recommendation may be appropriate is as follows. In designing electrical circuits or apparatuses, an engineer may place a component A in an apparatus, and this component A needs energy supply. If there are multiple possibilities to connect the new component A to energy sources, a semantic check could automatically evaluate the alternatives considering costs, robustness and safety; and give hints and recommendation to the engineer. This would save time and costs and potentially reduces the probability of negative consequences: premature blackout, short-circuit faults, and other defects.

D. Placing Objects in Lane Models

If a user wants to place a new object or move an existing object, the system can provide feedback as to which lanes can or cannot accommodate the objects that are sought to be placed or moved, depending on the meta model restrictions and/or the result of real-time semantic checks. There are certainly multiple possible ways of providing this feedback. The system disclosed herein can, for example, filter out all lanes that cannot contain the object as soon as the user starts a "place new object" mode. The same behavior can be used if the user takes action to move an existing object.

Reference is made to FIG. 25, a diagram showing indications of appropriate and inappropriate lanes for new or moved objects. FIG. 25 provides a good compromise between a good visual impression of invalid areas and implementation effort. In FIG. 25, all cells in the lane model which are invalid for a new object are shown in gray (as in Portion 25a), or just "crossed out" (as in Portion 25b).

Figure 26:
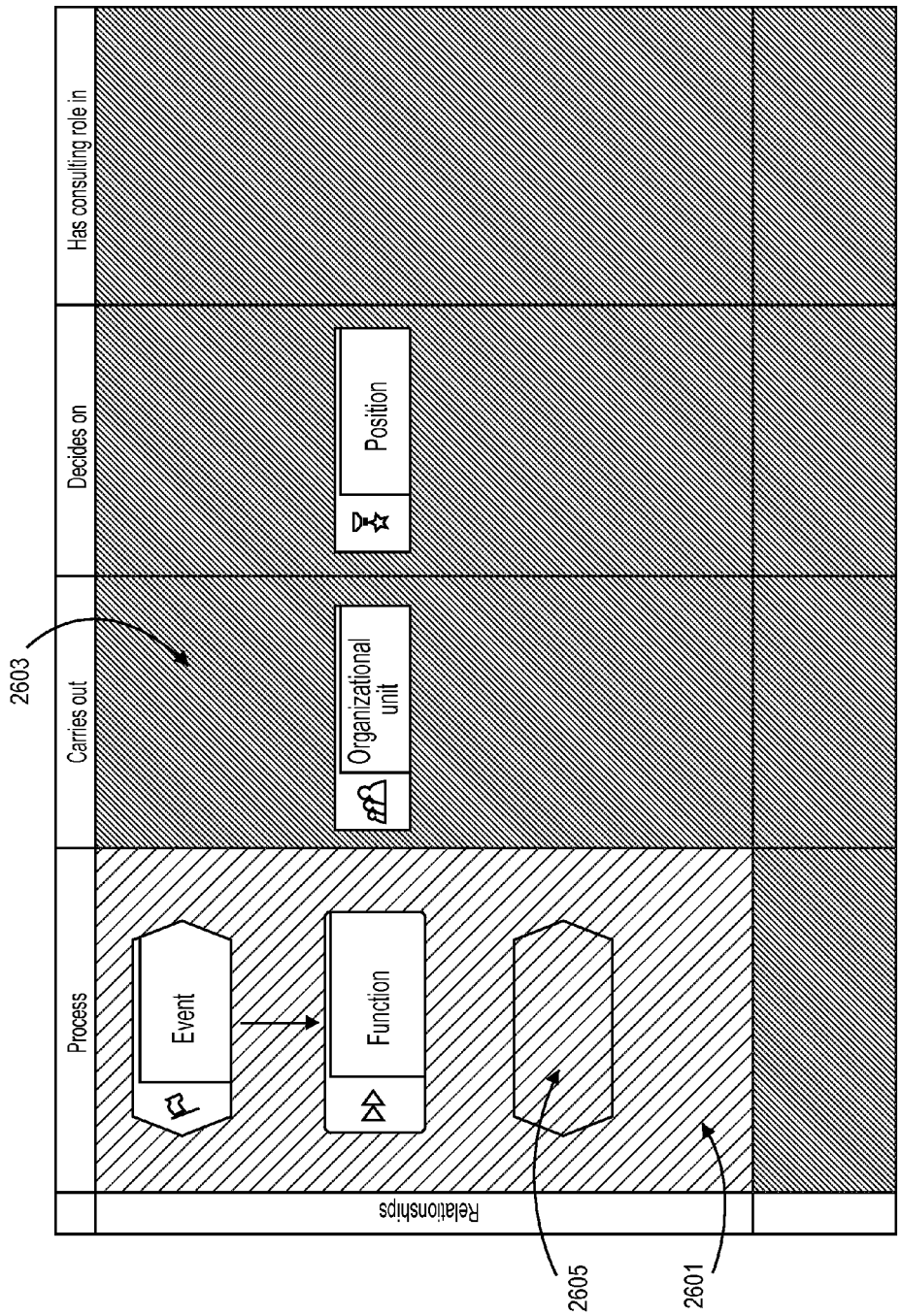
FIG. 26 is a diagram showing indications of appropriate and inappropriate lanes for new or moved objects using color.

Reference is made to FIG. 26, a diagram showing indications of appropriate and inappropriate lanes for new or moved objects using color. In FIG. 26, the vertical lane 2601 is hatched to indicate the color green. All the other lanes, including the carries out lane 2603, are shaded to indicate the color red. The red color indicates that such a placement is not in accord with the meta model rules. The new object 2605 is shown being placed in the green vertical lane 2601, the green color indicating that such a placement is in accord with the meta model rules.

Figure 27A:
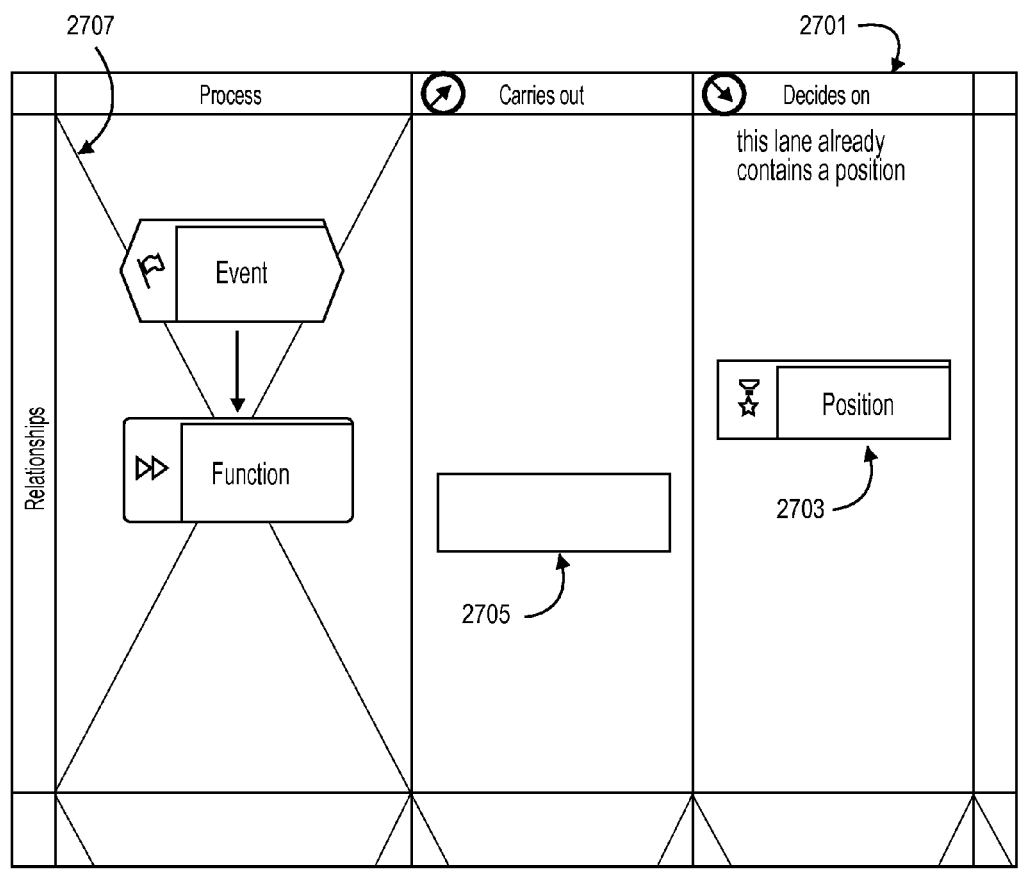
FIGS. 27A and 27B are diagrams illustrating both a meta model and semantic check of placement of an object in a lane.
Figure 27B:
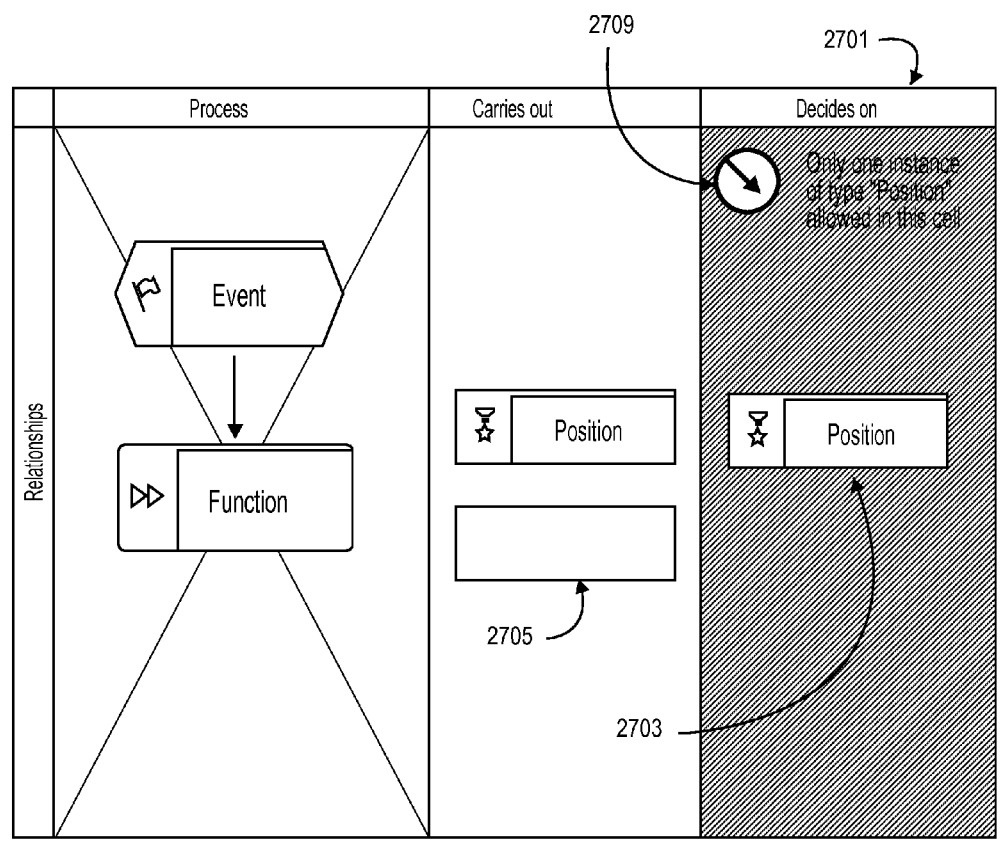

Of course placing an object in a correct lane may be also subject to semantic rules. Thus as soon as a user starts to move an existing object or create a new one, semantic checks can be triggered, in real-time, in response to selected objects as they are selected. Reference is made to FIGS. 27A and 27B, diagrams illustrating both a meta model and semantic check of placement of an object in a lane.

FIGS. 27A and 27B both assume that a vertical lane 2701 of type "Decides on" can contain only one object. It can be assumed that that "Position" object 2703 is previously placed in lane 2701. As a consequence, the new object 2705 cannot be placed in the "Decides on" lane 2701.

FIGS. 27A and 27B demonstrate how to differentiate between meta model checks and semantic checks. In FIG. 27A, lane cells that cannot be used for placing the object 2705 due to meta model restrictions are visually distinguished, for example, by being presented with a cross 2707 ("X") in the background. If a cell is an invalid area for the new object 2705 or moved object due to a semantic check, for the corresponding area, the reason 2709 (which is the result of the semantic check) can be presented to the user. Also, similarly to FIG. 26, in FIG. 27B the lane 2701 is shaded to indicate the color red, which further indicates that no further objects can be placed in the lane 2701. Of course, other colors or indicators may be used to visually notify the user of lane cells that can or cannot be used.

E. Placing Objects in Objects (Nesting)

If a user starts to place a new object or moves an existing one, the system can provide feedback indicating where the object can be placed or moved, depending on the meta model restrictions and/or on the result of real-time semantic checks.

Reference is made to FIG. 28, a diagram illustrating invalid targets in a nesting operation, according to a meta model. FIG. 28 comprises alternative Portions 28a and 28b. As shown in Portion 28a, a user has already created a model structure where the two "module" objects 2801, 2803 and the "programming language" object 2805 are already embedded into an outer "application system" object 2807. As soon as the user starts to place a new object 2809 or moves an existing one, the invention supports the user by filtering out all existing objects in the graph structure that cannot contain the new or moved object 2809.

There are clearly multiple ways of showing the unavailable objects. As seen in Portion 28a, the unavailable regions are indicated by simply fading (as "inactive") the borders of the unavailable regions. As seen in Portion 28b, there is another way of showing unavailable regions. In this example, the new object 2809 can be placed into either of the "Module" objects 2801, 2803 as indicated by non-blurred lines. However, it is clear that the new object cannot be placed into the "Programming language" object 2805 or the application system object 2807. Both the "Programming language" object 2805 and the application system object 2807 are significantly blurred.

This blurring action can also be used in conjunction with brightening of unavailable target objects. Depending on the user's preferences, this effect may be considered visually attractive, it differentiates unavailable target objects, and the user can still see the whole content of the graph structure.

Figure 29:
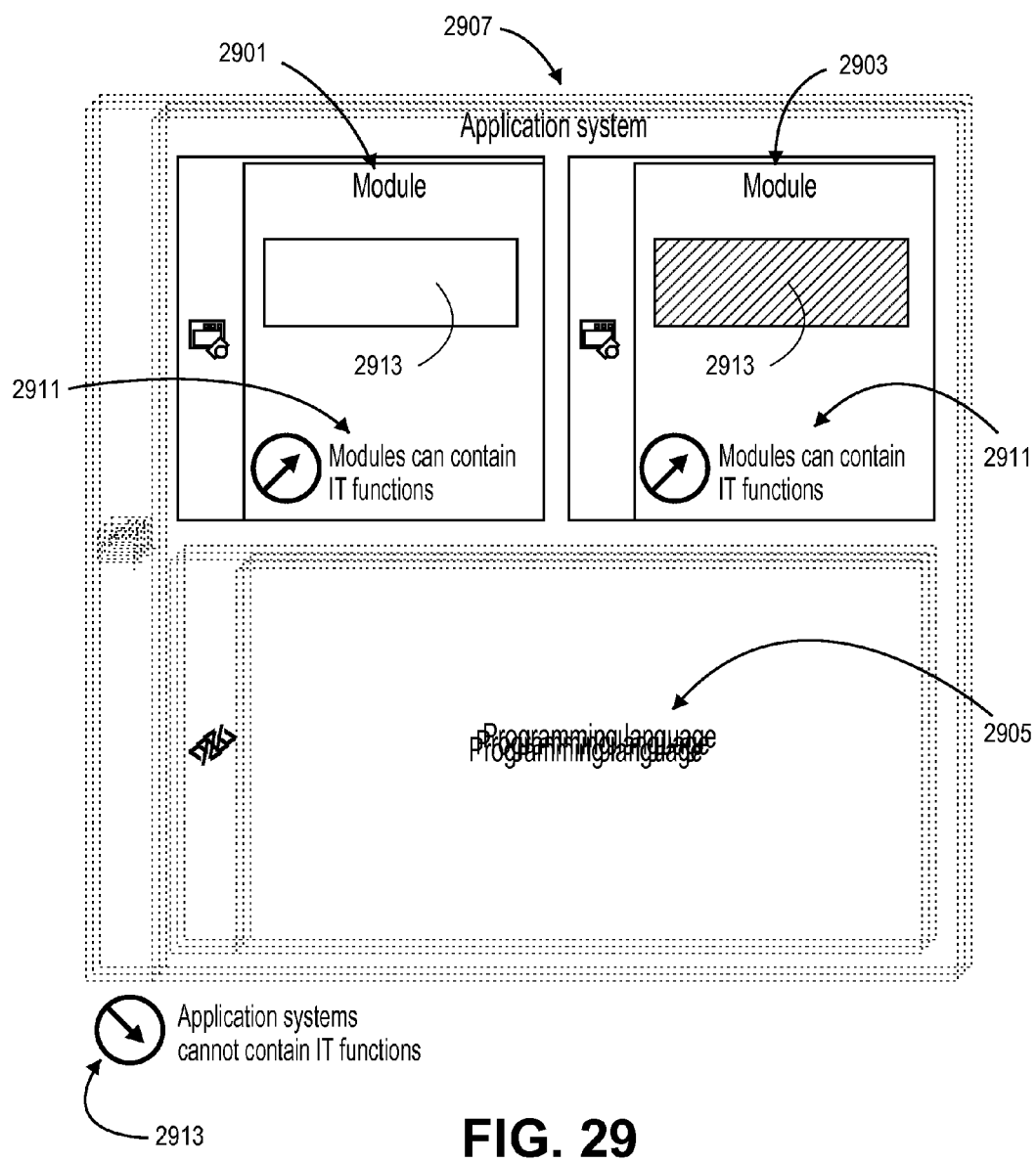
FIG. 29 is a diagram illustrating invalid targets in a nesting operation, according to semantic rules.

Reference is made to FIG. 29, a diagram illustrating invalid targets in a nesting operation, according to semantic rules. As with other operations, nesting in graph structures must adhere to semantic rules. In FIG. 29, it is assumed that a semantic check prohibits the "application system" object 2907 from containing an "IT Function" object 2913, even if it is so allowed in the meta model. The exemplary semantic check rule suggests that object 2913 having type "IT Functions" needs to be organized in objects 2901, 2903 of type "Module".

In FIG. 29, therefore, an IT function cannot be placed into application system 2907 according to a semantic rule. If a user starts to place an IT function object in the application system 2907, the "Application system" object 2907 is faded out because of conflict with the semantic check rule. It should be noted that the Programming language object 2905 is also prohibited from receiving an IT function object as indicated by the blurred lines.

Similar to other semantic checks, various types of warnings may be given to a user. Thus in addition to the fading and blurring of lines, semantic errors may result in a warning or recommendation. FIG. 29 shows both module objects 2901 and 2903 presenting a recommendation 2911 that modules can contain IT functions. A warning 2913 is also presented that advises that the application system object 2907 cannot contain IT functions. The semantic error checking may thus take the form of advising rather than pure error correction.

VI. Implementation Details

Prerequisites

An example implementation of the above-described embodiments is now described using pseudo code. The pseudo code is provided by way of example, and not by limitation, and will be understood by those of skill in the art to suggest various implementations which may be readily undertaken without undue experimentation. Table 2 below provides data structures that can be used in the implementation, and includes a description which may be helpful for understanding the pseudo code:

TABLE 2

| | DATA STRUCTURES | |
|---|---|---|
| Artifact | Type | Description |
| diagram | Diagram | Data structure containing the model itself, which means the graph and all lanes (→ Lane). |
| graph | Graph | This is the graph structure, existing of nodes (→ GraphNode), which are connected by connections (→ GraphEdge). Each graph node has a reference to the meta model (→ MetaModel). |

TABLE 2-continued

DATA STRUCTURES

| Artifact | Type | Description |
| --- | --- | --- |
| start_object | GraphNode | This is the selected object which should be deleted, when the implementation handles support for keeping the graph structure valid, i.e. maintaining consistency in the graph structure. |
| start_connection | GraphEdge | This is the selected connection which should be split in two, when the implementation handles support for splitting connections. |
| meta_model | MetaModel | The meta model contains all information, which objects may be connected with each other. The graph has a reference to the meta model |
|  | Lane | The lane is a data structure in the diagram which restricts its content according to the lane type defined in the meta model. Lanes can be horizontal or vertical. |
|  | LaneCell | Temporary created data structure, might describe the intersection of two lanes in a table model having both horizontal and vertical lanes. If a diagram only contains vertical or horizontal lanes, but not both, every lane is represented as one lane cell. |
| semcheck_engine | SemanticCheckEngine | The semantic check engine is the component containing all rules to check whether an object can be connected to another object. The graph has a reference to the semantic check engine. |
|  | Rule | Rules express restrictions for connecting objects |
|  | SemcheckResult | Return value for a semantic check done by a rule. |
|  | OPTIONS | This is the instance keeping all the options in the system. It delivers the options specified by the user (please see FIG. 17 and FIG. 19). |
|  | ConnectionType | An instance of this element describes a connection type between two object types (→ ObjectType) in the meta models. If the meta model does not deliver connection types for two specific object types, a connection between these two objects is not possible. |
|  | ConnectionStyle | Instances of "ConnectionStyle" are just used as a wrapper for graphical properties. |
|  | ObjectType | An instance of this element describes a certain node element which is possible in the graph. It is furthermore needed to be referenced from the connection types. An object type in the graph always defines a certain type of entity in the model type. Examples for object types can be "Activity" or "Event" in the model type "Event-driven process chain". |
|  | DialogForConnectionType | Implementing the dialog box shown in FIG. 17. |
|  | DialogToSplitConnections | Implementing the dialog box shown in FIG. 19 |
|  | Point | Coordinates in a graph model. Every graph node has a position described by a point. Edges have at least two points describing the route of the edge, but they can have more in order to build connection segments. |

Detailed pseudo code implementations follow, by way of example and not by limitation.

A. Deleting an Object (Keeping the Graph Structure Upright)

1. On Object is Deleted

Reference is made to FIG. 30, the pseudo code "onObjectIsDeleted" for deleting an object in a graph structure. The main routine reacts on detecting an event that the user deleted an object in the graph. The implementation checks whether there is just one predecessor and one successor to the object being deleted. If true, the meta model is fetched to determine all possible connection types. The meta model can be fetched using known techniques. Then the routine to create the new connection is triggered.

It should be noted that the implementation of FIG. 30 only considers structure building connections, because this is the main use case. Generally, it would also be possible to use every connection type allowed in the meta model between the two objects.

Among other things shown in the pseudo code of FIG. 30, the old connections (incoming and outgoing edges) are stored. Also, the pseudo code of FIG. 30 can take over the graphical properties from the old connections.

2. Try to Create New Connection

Reference is made to FIG. 31, the pseudo code in "tryToCreateNewConnection" for creating a new connection, and referenced in "onObjectIsDeleted". The implementation creates the connection. First all possible structure building connection types are determined by the meta model. Afterwards, according to the option and the amount of possible connection types, and the option specified by the user, the connection is created directly or the system shows a dialog to ask the user.

As shown in the pseudo code, if there is just one possible connection type, there is no need to ask the user what type of connection to create. In that case, the pseudo code can create a new connection without asking the user to choose the type of connection. If there is more than one possible connection type, the system can ask the user to choose one of the possible connection types and then creates the connection.

3. Create New Connection

Reference is made to FIG. 32, the pseudo code for "createNewConnection" referenced in "tryToCreateNewConnection". The method used to create the connection itself can just pass this task to the graph. The graph structure itself is able to create new elements. The connection created is returned, because it is needed afterwards.

4. Get Connection Type

Reference is made to FIG. 33, the pseudo code in "getConnectionTypeFromUser" referenced in "tryToCreateNewConnection". The implementation is used to ask the user for the used connection type. The process brings up a dialog, one example of which is illustrated in FIG. 17, although other dialog formats will be appreciated by one of skill.

5. Handle Graphic Properties

FIG. 34 presents the pseudo code in "handleGraphicProperties." Now that the new connection is created, this implementation takes over the handling of actual graphical properties.

B. Splitting Connections: Placing an Object onto a Connection Between Two Other Objects As described above, user support for splitting connections can considers the following use cases:

The first use case begins with an object or object type selection, wherein the user selects an object type to place in the graph, and the system presents all possible connections to the user. Alternatively, the first use case also includes a user moving an existing object by "drag and drop," wherein an object is dragged by the user, and the system presents all connections which can be used as "drop target" for the dragged object.

The second use case begins from a selection of a connection by the user. Then all possible objects to be placed on this connection are presented to the user.

Both use cases lead to the same action steps: deleting an old connection, placing a new object, and creating two new connections. However, the entry point in the second use case starts from a connection, and the entry point from the first use case starts from an object (type). The routines for handling the different use cases are now described.

1. First Use Case: Place New Object

In the first use case, in which the user places an object, all connection types are determined, which can be split by the corresponding object type. All connections which do not have one of those connection types can be displayed as invalid connections. Reference is made to FIG. 35, the pseudo code for "getEdgesForObjectType". This implementation can deliver all possible connections that can be split with the given object type, and on which the user can place an object, and the user can only place an object on a connection which is really valid and for which the object can be used to split the connection in two. This implementation does not deliver connections that cannot be split with the given object type or marks these connections as not valid upon which to place an object. FIG. 36 shows the pseudo code for "objectTypeCanBeUsedToSplit" which is referenced in "getEdgesForObjectType."

2. Second Use Case: Start From Connection

In the second use case, the user has selected a connection in the graph. FIGS. 37A and 37B show the pseudo code (over two sheets) for "getObjectTypesForConnection." This implementation provides the second use case where the implementation searches for all object types that can be used to split the selected connection in two. FIG. 21 is an example of a list of possible object types that are presented (one of the list eventually being selected) when a connection is selected; other displays are possible and within the scope contemplated herein.

3. Split the Connection

Although there are the two different functionalities for choosing the object type, no further determinations are needed as to whether the user has selected a valid combination of object type and connection before actually splitting the connection. In the first functionality, the user selected a connection, and then chose an object type to be used to split the connection. In the second functionality, the user selected an object type (either for creating a new object or by choosing to move an existing object), and then chose a connection on which to place the object type. In both situations, an object that will be placed is identified, and a connection which should be split is identified. That is to say, source and object targets are identified. Furthermore, by the determinations perform in the routines discussed above, only object and connection types which really can be used are provided to the user for selection. Therefore, an additional check is not needed after the user has selected the combination of object type and connection.

FIGS. 38A and 38B collectively present pseudo code (over two sheets) in "splitConnection" which implements the dual functionality requirements of selecting an object type and/or selecting a connection. FIG. 39 presents the pseudo code in the function "getConnectionTypes" that is referred to in "splitConnection." FIG. 40 presents the pseudo code in the function "createConnectionAndObject" that is also referred to in "splitConnection."

C. Creating New Connections

The "startCreateConnection" module is the entry point for creating new connections functionality. FIG. 41 presents example pseudo code for "startCreateConnection" related to creating new connections. The main routine first handles all objects, which cannot be connected due to the meta model. Afterwards, the results of the semantic checks are set. At the end of the procedure, the display can be updated.

FIG. 42 presents the pseudo code for a module named "handleAllInvalidOppositeObjectForMetaModel" which is an example routine to change the display for objects invalid for the meta model, that is, whether a connection is allowed between objects. This implementation which is referred to in "startCreateConnection" checks all objects in the graph structure to determine whether there is a connection allowed between these objects. FIG. 43 presents the pseudo code in "displayRuleCheckResults" which is the routine to check the semantics of the graph structure for those objects that have not been filtered out yet. The routine to check the semantic of the graph needs to consider only the objects which are not filtered out yet. The complete rule set of the semantic check engine can be considered. For every rule, all nodes of the graph structure can be considered, if the corresponding node is not filtered out already. According to the result of the semantic check, a hint can be displayed.

D. Placing Objects in Lanes

An example entry point in the present implementation for placing new objects into the diagram is shown in FIG. 44, the pseudo code for "placingNewObjectInToDiagram". This implementation can be the main routine. The main routine first acquires a list of "lane cells." The implementation then handles the feedback based on meta model restrictions. Afterwards, the result for the semantic checks is set. At the end of the procedure, the display can be updated.

FIG. 45 presents example pseudo code for the "getLaneCells" function that can be the first step of acquiring "lane cells" referenced in the function "placingNewObjectInToDiagram." "getLaneCells" collects all lane cells in the diagram. FIG. 46 presents example pseudo code for "displayMetaModelFeedback" which changes the display of invalid target lane cells according to the meta model checks. The pseudo code of FIG. 46 is of course referenced in the function "placingNewObjectInToDiagram" shown in FIG. 44.

Example pseudo code for a routine to execute the semantic check for the lane cells to consider only the lane cells which are not filtered out yet is provided in FIG. 47. The pseudo code for "displaySemanticCheckHints" can execute the semantic check for placing objects in lane cells is now described. Only lane related semantic check rules need to be considered. For every relevant rule, all lane cells of the graph structure (not previously filtered out by "displayMetaModelFeedback") can be considered. According to the result of the semantic check, a hint can be displayed.

E. Placing Objects in Objects

An example entry point for placing objects in objects is provided in FIG. 48, the pseudo code for "placingNewEmbeddedObjectInToDiagram." "placingNewEmbeddedObjectInToDiagram" can be the entry point for a nesting objects operation, and can also be the main routine. The main routine can handle feedback based on meta model restrictions first, and then can create a list of nodes valid from a meta model point of view. Afterwards, this list of valid nodes can be used as input for the semantic check. The results for the semantic check are then set. At the end of the procedure, the display can be updated.

FIG. 49 is example pseudo code for "displayMetaModelFeedback" which relates to changing the display of invalid target nodes according to the meta model. This implementation is of course referenced in "placingNewEmbeddedObjectInToDiagram." This implementation also can create a list of valid target nodes for later use in the semantic check.

Reference is made to FIG. 50, the pseudo code for "displaySemanticCheckHints" which is for executing the semantic check of nesting and/or embedding objects. Only embedding related semantic check rules must be considered. The semantics check of the embedded objects considers only valid nodes which are not filtered out by the "displayMetaModelFeedback" function. For every relevant rule, all valid nodes of the diagram, including those which are already embedded to other nodes, must be considered. According to the result of the semantic check, a hint may be displayed.

VII. Other Example Implementations

Figure 51:
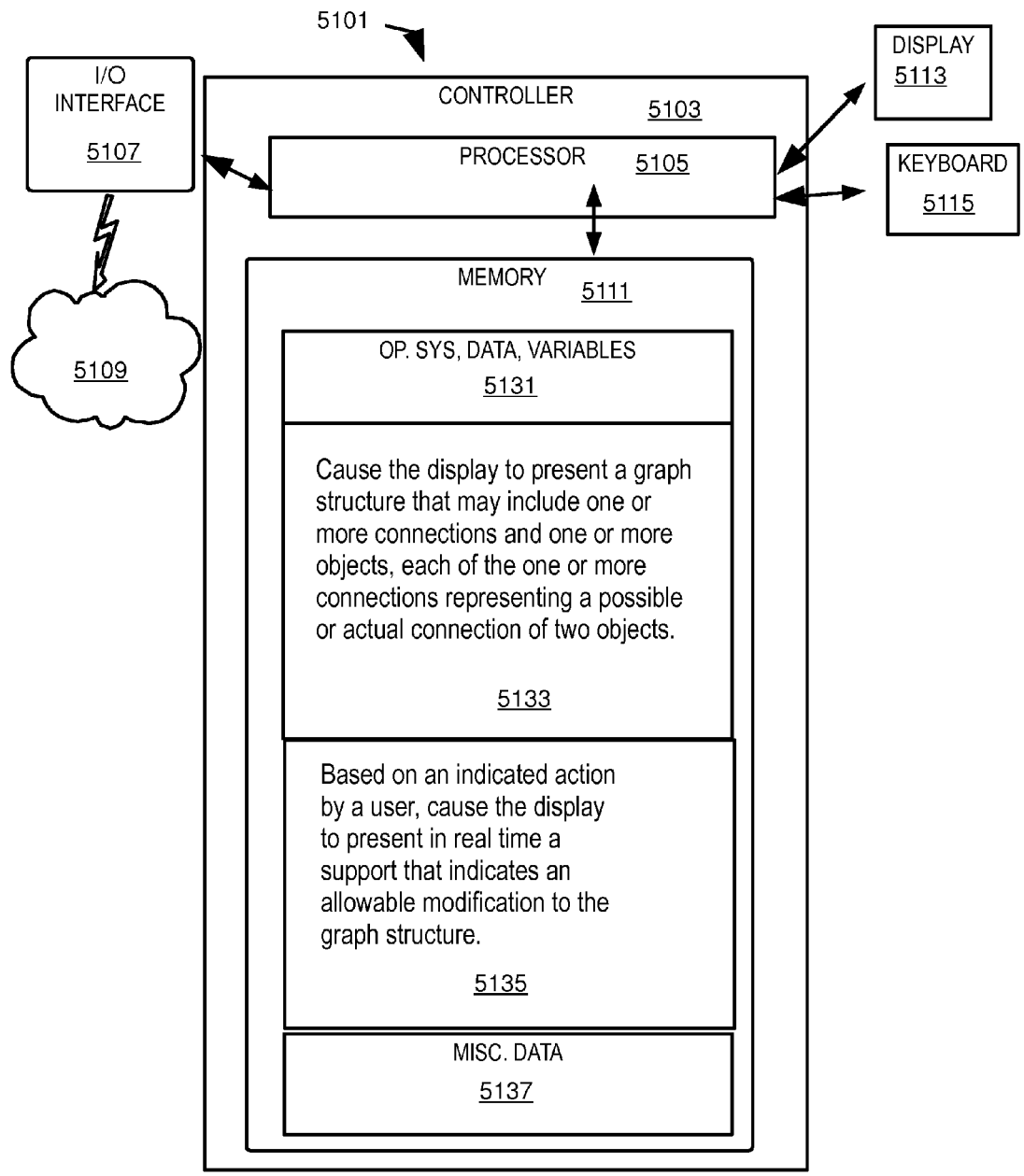
FIG. 51 is a block diagram illustrating relevant portions of a computer system for providing user support in designing graph structures.

Reference is made to FIG. 51, a block diagram illustrating relevant portions of a computer system 5101 for providing user support in designing graph structures. The computer system 5101 may include one or more controllers 5103, a processor 5105, an input/output (i/o) interface 5107 for communication such as with a computer network or data network 5109 (for example, a cloud, an intranet, the internet, etc.), a memory 5111, a display 5113, and/or a user input device represented here by a keyboard 5115. Alternatively, or in addition to the keyboard 5115, a user input device may comprise one or more of various known input devices, such as a keypad or a pointing device such as a computer mouse, a touchpad, a touch screen, joy stick, a trackball, or the like. The display 5113 may present information to the user by way of a conventional liquid crystal display (LCD) or other visual display, and/or by way of a conventional audible device (e.g., a speaker) for playing out audible messages. Portions of the computer system 5101 are well understood to those of skill in this area and have been omitted to avoid obscuring the discussion.

The processor 5105 may comprise one or more microprocessors and/or one or more digital signal processors. The memory 5111 may be coupled to the processor 5105 and may comprise a read-only memory (ROM), a random-access memory (RAM), a programmable ROM (PROM), and/or an electrically erasable read-only memory (EEPROM). The memory 5111 may include multiple memory locations for storing, among other things, an operating system, data and variables 5131 for programs executed by the processor 5105.

The memory 5111 further includes memory locations for computer programs for causing the processor 5105 to operate in connection with various functions. These functions include the causing 5133 the display 5113 to present a graph structure that may include one or more connections and one or more objects, each of the one or more connections representing a possible or actual connection of two objects. The functions also include, based on an indicated action by a user, causing 5135 the display 5113 to present, in real time, a support that indicates an allowable modification to the graph structure without indicating modifications that will not be allowed. Typically, the display 5113 is caused to present a user interface which offers the graph structure with connections and object(s), and can interact with the user via, for example, the keyboard 5115 through which the user can indicate, to the computer 5101, a desired action.

The computer programs may be stored, for example, in ROM or PROM and may direct the processor 5105 in controlling the operation of the computer 5101. The various embodiments that demonstrate how the processor causes the graph structure to be presented with one or more connections and one or more objects are detailed above. Further, the various embodiments detailed above show how the user takes an action that causes the processor to direct the display to present various support techniques. As will be understood in this field, the memory 5111 also can include locations for other miscellaneous data 5137 along with the usual temporary storage and other instructions for other programs not considered herein.

Figure 52:
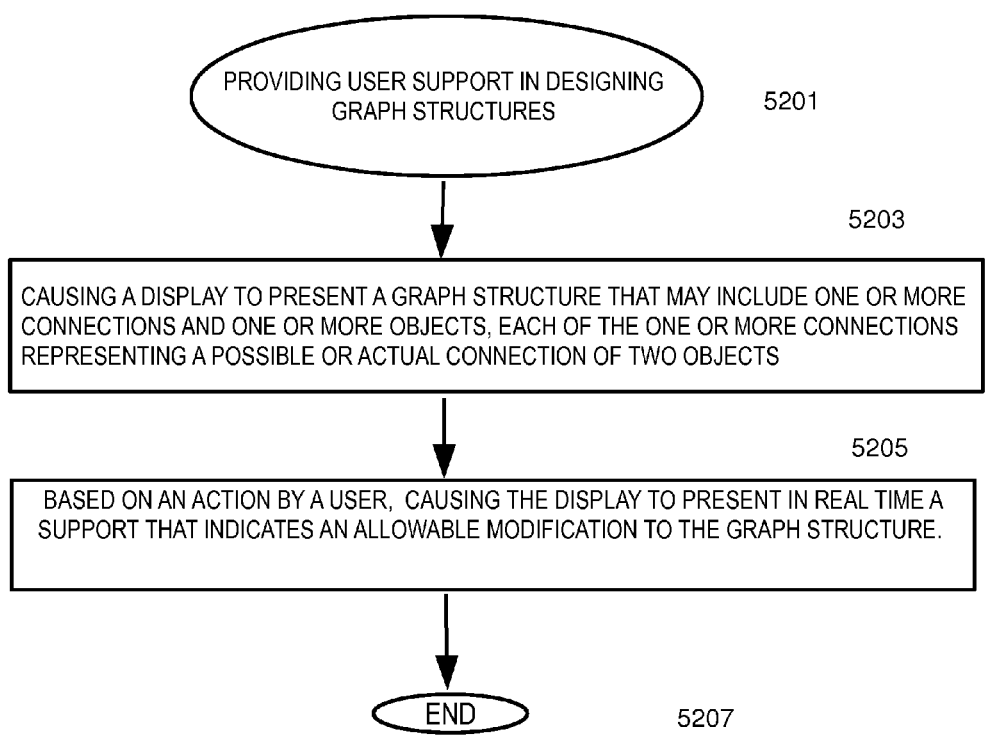
FIG. 52 is a block diagram illustrating a process for providing user support in designing graph structures.

Reference is made to FIG. 52, a flow chart illustrating a process 5201 of providing user support in designing graph structures. The method includes causing 5203 the display to present a graph structure that may include one or more connections and one or more objects. Each of the one or more connections represents a possible or actual connection of two objects. The method further includes causing 5205, based on an action by a user, the display to present, in real time, a support that indicates an allowable modification to the graph structure without indicating modifications that will not be allowed.

VIII. Miscellaneous

The various embodiments that demonstrate how the process of providing user support is implemented have been discussed in detail above. It should be further noted that the above described process of providing user support can be stored as instructions in computer-readable storage medium. When the instructions are executed by a computer, the process is performed.

The above discussion has involved particular examples. However, the principles apply equally to other examples and/or realizations. Naturally, the relevant data may differ, as appropriate. Further, the above has been discussed in certain examples as if made available by a provider to a single user at a single site. The above described system, device and/or method may be used by numerous users over distributed systems, if preferred.

Furthermore, any communication networks implicated in an embodiment can include by way of example but not limitation data and/or packet communications networks, which can provide wireless communications capability and/or utilize wireline connections such as cable and/or a connector, or similar. Any appropriate communication protocol may be used.

A computer-readable storage medium is tangible and non-transitory; a computer-readable storage medium can be any of the memory or disks, such as those examples described above, or other removable or fixed storage medium, provided such computer-readable storage medium is tangible and non-transitory.

One or more displays for the system may be developed in connection with, by way of example but not limitation, HTML display format. Although HTML may be the preferred display format, it is possible to utilize alternative display formats for interacting with a user and obtaining user instructions.

The system used in connection with various embodiments may (or may not) rely on the integration of various components including, as appropriate and/or if desired, but not by way of limitation, hardware and software servers, applications software, database engines, server area networks, firewall and SSL security, production back-up systems, and/or applications interface software. The configuration may be, by way of example but not by way of limitation, network-based and can utilize the Internet as an exemplary interface with the user for information delivery.

One or more databases implicated by the above discussion may be, by way of example but not limitation, in a relational database format, but other standard data formats may also be used. Windows 7, for example, may be used, but other standard operating systems may also be used. Optionally, the various databases include a conversion system capable of receiving data in various standard formats.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
a memory;
a display; and
a processor cooperatively operable with the display and the memory, and configured to, based on instructions stored in the memory:
  cause the display to present, on a user interface, a visualization of a graph structure that includes one or more connections and one or more objects, each of the one or more connections representing a possible or actual connection of two or more objects, and
  in response to an action by a user that selects at least one of the one or more connections and one or more objects, cause the display to present, on the user interface, in real time, a support that indicates an allowable modification to the graph structure based on a methodology to which the graph structure is assigned and the selection of the at least one of the one or more connections and one or more objects, wherein
when the action by the user is deletion of an existing object that is connected between a first object and a second object, the support is a dialog box that shows, as the allowable modification, one or more connections that can connect the first and second objects depending on the nature of the relationship of the first and second object to each other according to the methodology of the graph structure,
when the action by the user is a selection of a new or existing object for placement onto an existing connection that connects a first object and a second object, the support is a catchpoint that indicates, as the allowable modification, that the existing connection is available for placement of the new or existing object according to the methodology of the graph structure, and
when the action by the user is a selection of an existing connection that connects a first object and a second object, the support is a displayed list that shows, as the allowable modification, those objects that can be placed onto the existing connection so as to split the existing connection, in consideration of the first object the second object according to the methodology of the graph structure.

2. The computer system according to claim 1, wherein:
when the action by the user is a selection of a new or existing object for placement onto an existing connection that connects a first object and a second object, the support is a dialog box that shows, as the allowable modification, possible connection types between the first object and the new or existing object and possible connection types between the new or existing object and the second object according to the methodology of the graph structure.

3. The computer system according to claim 1, wherein:
when the action by the user is creating a connection, as a created connection, that is extended from a placed object, the support is a filtering out of an existing object that cannot be used, based on methodological type rules according to the methodology of the graph structure, as a connectable object to the placed object through the created connection, such that any unfiltered object is presented as the allowable modification.

4. The computer system according to claim 3, wherein:
the support further includes a filtering out of an additional existing object that cannot be used, based on semantic type rules according to the methodology of the graph structure, as a connectable object to the placed object through the created connection.

5. The computer system according to claim 3, wherein:
the support further includes providing a hint regarding an additional existing object that cannot be used, based on semantic type rules according to the methodology of the graph structure, as a connectable object to the placed object through the created connection.

6. The computer system according to claim 1, wherein:
when the action by the user is selection of a new or existing object for placement into a lane, the support is at least one of a visual indication in a first presentation of the lane that the new or existing object can be placed into the lane and a visual indication in a second alternative presentation of the lane that the new or existing object cannot be placed in the lane, according to the methodology of the graph structure.

7. The computer system according to claim 6, wherein:
the support further includes presenting a hint in the lane or in an alternative lane that the new or existing object cannot be placed, based on semantic type rules according to the methodology of the graph structure, into the lane or the alternative lane.

8. A non-transitory, computer-readable storage medium with instructions stored thereon, which when executed by a processor-based computer system that includes a display, results in performance of a method including:
causing the display to present, on a user interface, a visualization of a graph structure that includes one or more connections and one or more objects, each of the one or more connections represents a possible or actual connection of two or more objects, and
in response to an action by a user that selects at least one of the one or more connections and one or more objects, causing the display to present, on the user interface, in real time, a support that indicates an allowable modification to the graph structure based on a methodology to which the graph structure is assigned and the selection of the at least one of the one or more connections and one or more objects, wherein
when the action by the user is deletion of an existing object that is connected between a first object and a second object, the support is a dialog box that shows, as the allowable modification, one or more connections that can connect the first and second objects depending on the nature of the relationship of the first and second object to each other according to the methodology of the graph structure,
when the action by the user is a selection of a new or existing object for placement onto an existing connection that connects a first object and a second object, the support is a catchpoint that indicates, as the allowable modification, that the existing connection is available for placement of the new or existing object according to the methodology of the graph structure, and
when the action by the user is a selection of an existing connection that connects a first object and a second object, the support is a displayed list that shows, as the allowable modification, those objects that can be placed onto the existing connection so as to split the existing connection, in consideration of the first object the second object according to the methodology of the graph structure.

9. The non-transitory, computer-readable storage medium according to claim 8, wherein:
when the action by the user is a selection of a new or existing object for placement onto an existing connection that connects a first object and a second object, the support is a dialog box that shows, as the allowable modification, possible connection types between the first object and the new or existing object and possible connection types between the new or existing object and the second object according to the methodology of the graph structure.

10. The non-transitory, computer-readable storage medium according to claim 8, wherein:
when the action by the user is creating a connection, as a created connection, that is extended from a placed object, the support is a filtering out of an existing object that cannot be used, based on methodological type rules according to the methodology of the graph structure, as a connectable object to the placed object through the created connection, such that any unfiltered object is presented as the allowable modification.

11. The non-transitory, computer-readable storage medium according to claim 10, wherein:
the support further includes a filtering out of an additional existing object that cannot be used, based on semantic type rules according to the methodology of the graph structure, as a connectable object to the placed object through the created connection.

12. The non-transitory, computer-readable storage medium according to claim 10, wherein:
the support further includes providing a hint regarding an additional existing object that cannot be used, based on semantic type rules, as a connectable object to the placed object through the created connection according to the methodology of the graph structure.

13. The non-transitory, computer-readable storage medium according to claim 8, wherein:
when the action by the user is selection of a new or existing object for placement into a lane, the support is at least one of a visual indication in a first presentation of the lane that the new or existing object can be placed into the lane and a visual indication in a second alternative presentation of the lane that the new or existing object cannot be placed in the lane, according to the methodology of the graph structure.

14. The non-transitory, computer-readable storage medium according to claim 13, wherein:
the support further includes presenting a hint in the lane or in an alternative lane that the new or existing object cannot be placed, based on semantic type rules, into the lane or the alternative lane.

* * * * *